US012286941B2

(12) United States Patent
Wood et al.

(10) Patent No.: US 12,286,941 B2
(45) Date of Patent: Apr. 29, 2025

(54) REVERSE THRUST TURBOFAN ENGINE

(71) Applicant: General Electric Company, Schenectady, NY (US)

(72) Inventors: Trevor Howard Wood, Clifton Park, NY (US); Thomas Malkus, Albany, NY (US); Kishore Ramakrishnan, Rexford, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/299,102

(22) Filed: Apr. 12, 2023

(65) Prior Publication Data

US 2023/0340927 A1    Oct. 26, 2023

Related U.S. Application Data

(62) Division of application No. 17/729,415, filed on Apr. 26, 2022.

(51) Int. Cl.
*F02K 1/66* (2006.01)
*F02K 1/32* (2006.01)

(52) U.S. Cl.
CPC . *F02K 1/66* (2013.01); *F02K 1/32* (2013.01)

(58) Field of Classification Search
CPC ............... F02K 1/70; F02K 1/72; F02K 1/32
See application file for complete search history.

(56) References Cited

U.S. PATENT DOCUMENTS

| 3,702,121 A | 11/1972 | Millman |
| 3,747,341 A | 7/1973 | Davis |
| 3,820,719 A | 6/1974 | Clark |
| 3,824,785 A | 7/1974 | Soligny et al. |

(Continued)

FOREIGN PATENT DOCUMENTS

| FR | 3107932 A1 * | 9/2021 | ............... F02K 1/66 |
| GB | 1357370 A   * | 6/1974 | ............... F02K 1/28 |

(Continued)

OTHER PUBLICATIONS

You et al., Study of Flow Separation Over an Airfoil with Synthetic Jet Control Using Large-Eddy Simulation By, Stanford Edu, Center for Turbulence Research Annual Research Briefs, 2007, 11 Pages.

*Primary Examiner* — Ted Kim
(74) *Attorney, Agent, or Firm* — Dority & Manning, P.A.

(57) ABSTRACT

A turbofan engine may include a variable pitch fan rotatable about an axis and operable in a forward thrust mode by generating flow opposite a direction of travel and in a reverse thrust mode by generating flow in the direction of travel. In reverse thrust mode, a nacelle assembly defines an intermediate opening disposed aft of the variable pitch fan. A flow guide assembly is configured to guide a first fluid flow opposite the direction of travel within a bypass passage from a forward opening to an aft opening of the nacelle assembly in forward thrust mode, and to redirect a second fluid flow from outside the bypass passage opposite the direction of travel to inside the bypass passage in the direction of travel through the intermediate opening in reverse thrust mode. One or more flow channels are defined for generating at least one fluidic injection pressurized by a core.

8 Claims, 13 Drawing Sheets

(56) References Cited

U.S. PATENT DOCUMENTS

| | | | |
|---|---|---|---|
| 3,871,844 A | 3/1975 | Calvin, Sr. | |
| 3,897,001 A | 7/1975 | Helmintoller, Jr. et al. | |
| 4,232,516 A | 11/1980 | Lewis et al. | |
| 5,090,196 A | 2/1992 | Balzer | |
| 5,315,821 A | 5/1994 | Dunbar et al. | |
| 5,568,724 A * | 10/1996 | Lindner | F02K 1/66 60/226.2 |
| 5,971,328 A | 10/1999 | Kota | |
| 6,318,070 B1 * | 11/2001 | Rey | F02K 1/1207 60/226.3 |
| 6,491,262 B1 | 12/2002 | Kota | |
| 6,568,172 B2 | 5/2003 | Jannetta et al. | |
| 6,968,675 B2 | 11/2005 | Ramlaoui et al. | |
| 7,384,016 B2 | 6/2008 | Kota et al. | |
| 7,891,167 B2 | 2/2011 | Udall | |
| 8,109,466 B2 | 2/2012 | Aten et al. | |
| 8,459,597 B2 | 6/2013 | Cloft et al. | |
| 8,578,698 B2 | 11/2013 | Vauchel | |
| 9,650,991 B2 | 5/2017 | Jasklowski | |
| 9,874,176 B2 | 1/2018 | Nakhjavani | |
| 9,938,852 B2 | 4/2018 | Lumbab et al. | |
| 10,041,443 B2 | 8/2018 | Foutch | |
| 10,113,508 B2 | 10/2018 | Stuart et al. | |
| 10,208,708 B2 | 2/2019 | Gormley | |
| 10,336,460 B2 | 7/2019 | Ravise et al. | |
| 10,378,481 B2 | 8/2019 | Fert | |
| 10,514,004 B2 | 12/2019 | Crawford | |
| 10,532,820 B2 | 1/2020 | Caruel | |
| 10,533,521 B2 | 1/2020 | Harpal et al. | |
| 10,655,564 B2 | 5/2020 | Gormley | |
| 11,053,888 B2 | 7/2021 | Vassberg et al. | |
| 11,084,599 B2 | 8/2021 | Iglewski et al. | |
| 2005/0229585 A1 * | 10/2005 | Webster | F02K 1/42 60/262 |
| 2009/0277155 A1 * | 11/2009 | Bulin | F02K 1/30 60/226.3 |
| 2011/0030338 A1 | 2/2011 | Vauchel | |
| 2018/0135557 A1 | 5/2018 | Pouyau et al. | |
| 2021/0122484 A1 | 4/2021 | Jodet et al. | |
| 2023/0090029 A1 | 3/2023 | Lebeault et al. | |

FOREIGN PATENT DOCUMENTS

| | | |
|---|---|---|
| GB | 2156004 A | 10/1985 |
| WO | WO2007122368 A1 | 11/2007 |

* cited by examiner

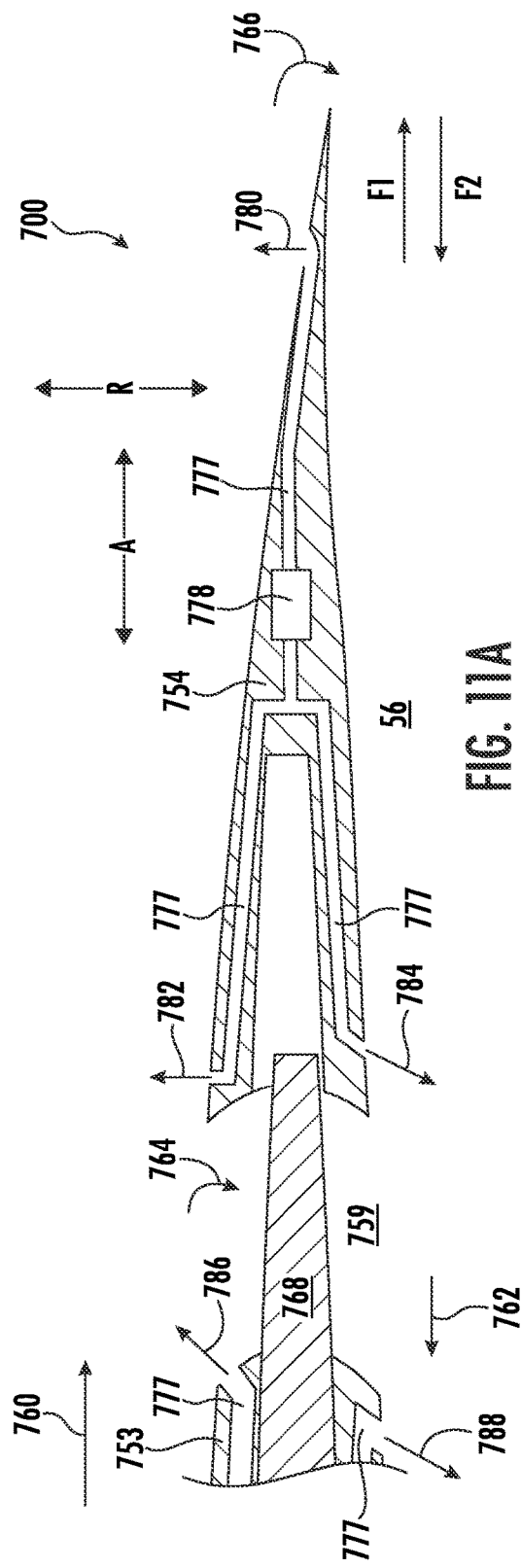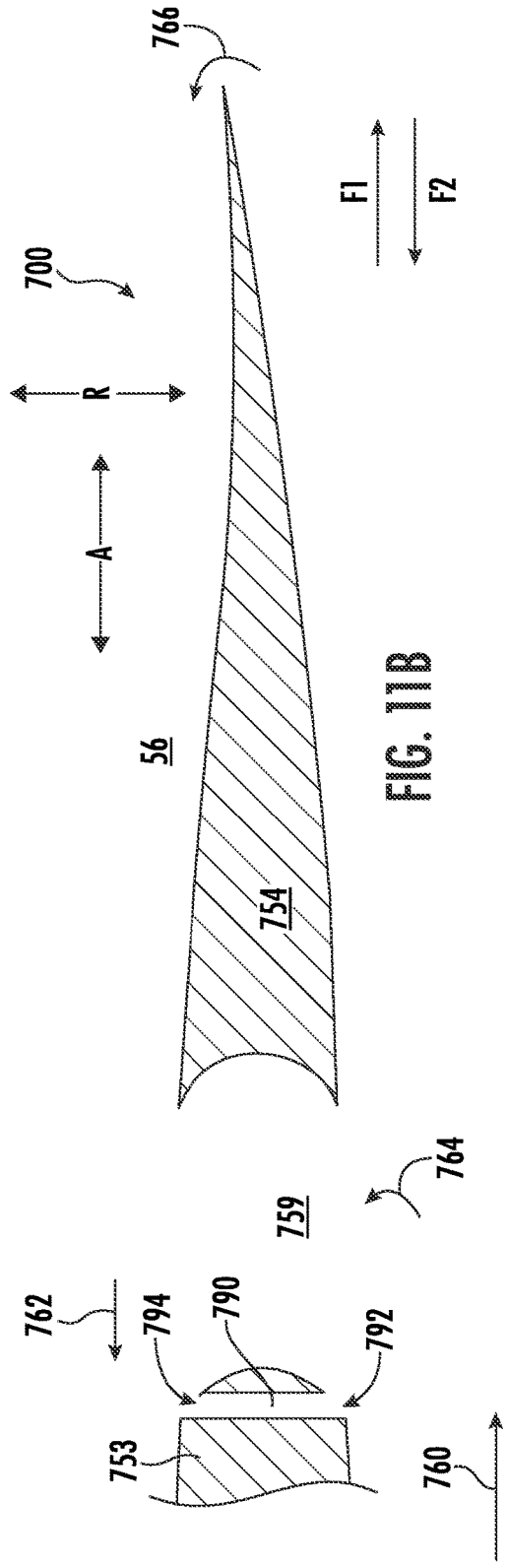

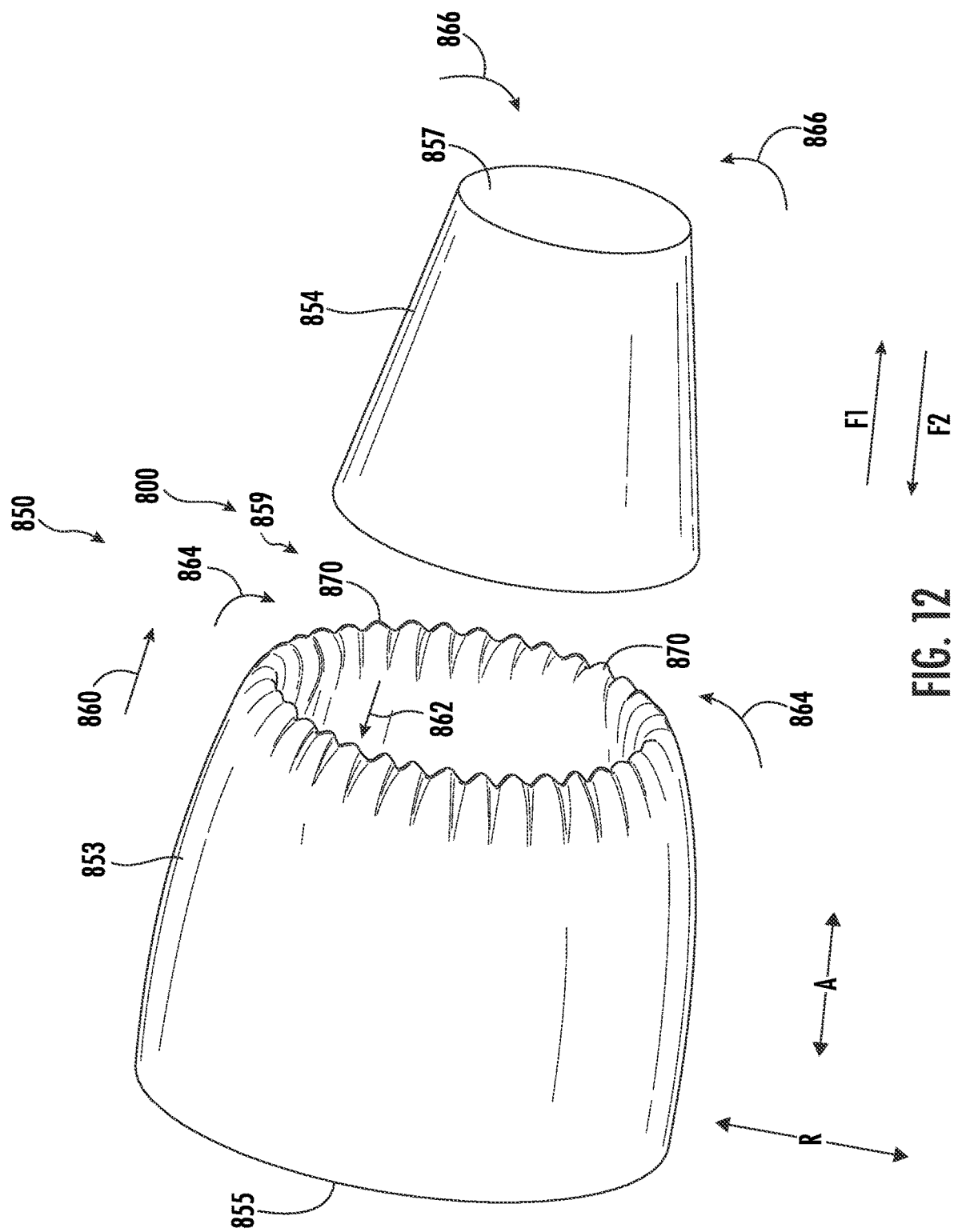

REVERSE THRUST TURBOFAN ENGINE

CROSS-REFERENCE TO RELATED APPLICATIONS

This application is a divisional application of U.S. application Ser. No. 17/729,415 filed Apr. 26, 2022, which is hereby incorporated by reference in its entirety.

FIELD

The present disclosure generally relates to a turbofan engine having a thrust reverser system.

BACKGROUND

Turbofan engines generally include a fan and a turbomachine arranged in flow communication with one another. The turbomachine of the turbofan engine generally includes, in serial flow order, a compression section, a combustion section, a turbine section, and an exhaust section. In operation, the air provided to the turbomachine flows through the compression section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Thrust reverser systems can be employed in turbofan engines to reduce a landing distance or a load on braking systems of an aircraft. Thrust reverser systems can be bulky, increasing the engine size and weight. Some thrust reverser systems may sacrifice flow control properties to pursue size and weight goals. The inventors of the present disclosure have found that there is a need for one or more features to improve thrust reverser flow control properties while meeting weight and/or overall size goals for a turbofan engine.

BRIEF DESCRIPTION OF THE DRAWINGS

The accompanying drawings, which are incorporated in and constitute a part of this specification, illustrate embodiments of the present disclosure and, together with the description, serve to explain principles of the disclosure.

FIG. 11a is an enlarged view of the exemplary turbofan of FIG. 9.

FIG. 11b is another enlarged view of the exemplary turbofan of FIG. 9.

FIG. 12 is a partial perspective view of an exemplary nacelle assembly according to an embodiment.

Other aspects and advantages of the embodiments disclosed herein will become apparent upon consideration of the following detailed description, wherein similar or identical structures may have similar or identical reference numerals.

DETAILED DESCRIPTION

Figure 1:
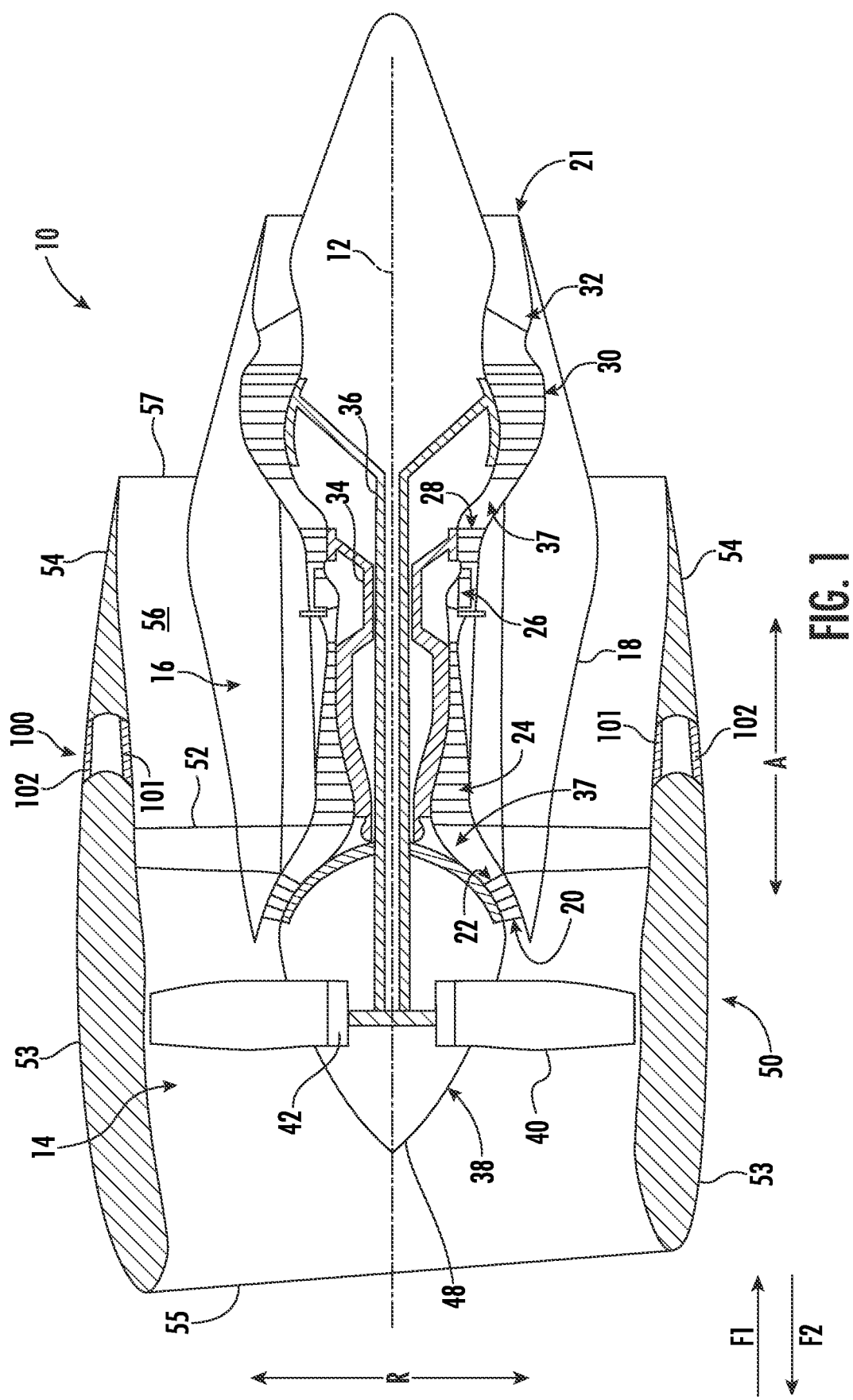
FIG. 1 is a schematic cross-sectional view of an exemplary turbofan engine in a stowed configuration according to various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first" and "second" may be used interchangeably to distinguish one component from another and are not intended to signify location or importance of the individual components.

The terms "forward" and "aft" refer to relative positions within a turbofan engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, in certain contexts, the approximating language may refer to being within a 10% margin.

Here and throughout the specification and claims, range limitations may be combined and interchanged, such that all ranges disclosed herein are inclusive of the endpoints, and the endpoints are independently combinable with each other.

The term "at least one of" in the context of, e.g., "at least one of A, B, or C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "turbofan engine" refers to an engine having a turbomachine as all or a portion of its power source. Example turbofan engines include gas turbine engines, turboprop engines, turbojet engines, turboshaft engines, etc., as well as hybrid-electric versions of one or more of these engines. As used herein, various aspects relate to a thrust reverse system employed with a nacelle encompassing a fan. It should be appreciated that application of such aspects to an electrically driven fan enshrouded by a duct or nacelle is also contemplated—i.e., the thrust reversers as used herein need not be limited to gas turbine engines, but may also be used with any propulsive mode, including electric and hybrid-electric turbofan engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

In some embodiments, one or more components of the turbofan engine described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the production of airfoils, turbine vanes and rotors, compressor vanes and rotors, and/or fan blades. Such components may have unique features, configurations, thicknesses, materials, densities, fluid passageways, headers, and mounting structures that may not have been possible or practical using prior manufacturing methods. Some of these features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts throughout the embodiments.

The present disclosure is directed generally towards a turbofan engine configured to operate in a reverse thrust mode. For example, the turbofan engine may have a variable pitch fan configured to produce flow opposite a direction of aircraft travel in a forward thrust mode and in the direction of aircraft travel in a reverse thrust mode. With more of the operating life of the engine spent in the forward thrust mode, flow properties may be designed to preferentially benefit in the forward thrust mode. This disclosure seeks to provide a flow guide assembly configured to control airflow in the reverse thrust mode.

In the reverse thrust mode, air may be flowed in the direction of aircraft travel from a forward opening in a nacelle. Various sources of mass airflow may be provided for this reverse thrust exhaust, for example through aft or intermediate openings in the nacelle. These aft and intermediate openings may be tuned such that in the reverse thrust mode, at least one flow guide assembly acts to control flow. For example, at least one flow guide assembly may be operable to avoid flow separation in redirecting flow to the direction of travel or in maintaining flow in the direction of travel.

The inventors of the present disclosure have discovered that such a configuration may allow for better control of airflow in the reverse thrust mode. In particular, the inventors of the present disclosure have found that providing for at least one flow guide assembly for reverse thrust operation may improve reverse thrust ability, leading to a more compact nacelle and reduced demand on friction braking.

It will be appreciated that various embodiments of the flow guide assembly may include one or more of a deployable nacelle component, control vane, air jet or fluidic outflow, as well as further embodiments as described in greater detail with reference to the drawings below.

Referring now to the drawings, FIG. 1 is a schematic cross-sectional view of a turbofan engine in accordance with an exemplary embodiment of the present disclosure. As explained in greater detail below, the turbofan engine depicted in FIG. 1 is shown in a stowed configuration to provide forward thrust in a forward thrust mode. More particularly, for the embodiment of FIG. 1, the turbofan engine is a high-bypass turbofan jet engine 10, referred to herein as "turbofan engine 10." As shown in FIG. 1, the turbofan engine 10 defines an axial direction A (extending parallel to a rotational axis, for example a centerline axis 12 of the turbofan engine 10 provided for reference) and a radial direction R. A first flow direction F1 is defined, describing the general directional flow of air through the turbofan engine 10 during normal operation such as takeoff and cruise. A second flow direction F2 is also defined, describing the general direction flow of air through the turbofan engine 10 during reverse thrust operation. The second flow direction F2 is generally opposite to the first flow direction F1, and the second flow direction F2 may also be described as a direction of travel of an aircraft to which the turbofan engine is attached. In general, the turbofan engine 10 includes a fan section 14 and a turbomachine 16 disposed aft, or downstream in the depicted forward thrust mode, from the fan section 14.

The exemplary turbomachine 16 depicted is generally enclosed within a substantially tubular outer casing 18 that defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and jet exhaust nozzle section 32 together define a core air flowpath 37 therethrough.

For the embodiment depicted, the fan section 14 includes a variable pitch fan 38 having a plurality of fan blades 40. In this variable pitch arrangement, pitch of the fan blades 40 is tunable, for example with various pitch change mechanisms (not shown) to generate forward thrust or reverse thrust variable with flight and operating conditions. The fan blades 40 are each attached to a disk 42, with the fan blades 40 and disk 42 together rotatable about the centerline axis 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by a rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is at least partially supported relative to the turbomachine 16 by a plurality of circumferentially-spaced outlet guide vanes 52. A forward section 53 of the nacelle assembly 50 extends over the plurality of fan blades 40 and may be referred to as a fan casing or a fan cowl. Moreover, an aft section 54, also referred to as an aft cowl, of the nacelle assembly 50 extends over an outer portion of the outer casing 18. The nacelle assembly 50 defines at least in part a bypass passage 56, and in particular for the embodiment depicted, the aft section 54 defines the bypass passage 56 with the outer portion of the outer casing 18. As discussed in greater detail below, the aft section 54 may also be referred to as a transcowl, for example when displaceable relative to the forward section 53 in the axial direction A. The ratio between a first portion of air through the bypass passage 56 and a second portion of air through the annular inlet 20 of the turbomachine 16, and through the core air flowpath 37, is commonly known as a bypass ratio.

Additionally, as will be discussed in greater detail with reference to the exemplary embodiments below, the nacelle assembly 50 includes a flow guide assembly 100 and defines a forward opening 55 and an aft opening 57. As depicted, the flow guide assembly 100 is depicted in the stowed configuration such that the flow guide assembly 100 is closed. In this configuration, the flow guide assembly 100 is configured to facilitate airflow in the first flow direction F1 from the forward opening 55 to the aft opening 57 of the nacelle assembly 50. In this way, flow can be guided through the entirety of the bypass passage 56 disposed at least in part between the forward opening 55 and the aft opening 57. For example, the flow guide assembly 100 may include a smooth junction between the forward section 53 and the aft section 54 of the nacelle assembly 50 to maintain smooth flow inside the bypass passage 56 and outside of the nacelle assembly 50.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools, a reduction gearbox between the LP shaft 36 and the fan 38, etc.

Referring still to FIG. 1, the flow guide assembly 100 may include one or more movable members, for example at least one first or inner movable member 101 and at least one second or outer movable member 102. In the depicted stowed configuration, the movable members 101, 102 may be configured to facilitate airflow in the first flow direction F1. As shown, the inner movable member 101 provides a smooth transition between the forward section 53 and the aft section 54 of the nacelle assembly 50 in the bypass passage 56. In an embodiment, the inner movable member 101 is configured to form a continuous or near continuous surface with the forward section 53 and the aft section 54. The outer movable member 102 depicted in FIG. 1 provides a smooth transition between the forward section 53 and the aft section 54 of the nacelle assembly 50 facing outside the nacelle assembly 50. In an embodiment, the outer movable member 102 is configured to form a continuous or near continuous surface with the forward section 53 and the aft section 54. In this manner, the turbofan engine 10 can operate in the forward thrust mode without interruption or flow interference from the flow guide assembly 100. As such, with at least its movable members 101, 102, the flow guide assembly 100 is configured to guide a fluid flow in the first flow direction F1, opposite the direction of travel, within the bypass passage 56 from the forward opening 55 to the aft opening 57 in the forward thrust mode.

The movable members 101, 102 may be disposed circumferentially about the nacelle assembly 50. For example, a paired set of the inner movable member 101 and the outer movable member 102 may be disposed circumferentially between fixed portions of the nacelle assembly 50 providing support and relative location between the forward section 53 and the aft section 54. For example, the forward section 53 and the aft section 54 may form a single piece with circumferentially-spaced openings provided for the movable members 101, 102. Alternatively, one or more inner supports (not shown) could be provided between pairs of the inner movable member 101 and the outer movable member 102 to locate the forward section 53 and the aft section 54 relative to one another. It should be understood that the movable members 101, 102 may be disposed in any arrangement and spacing around nacelle assembly 50, symmetrically or asymmetrically. It should be understood that the other features described herein with reference to the sectional views of the following figures may be similarly circumferentially disposed, with any number of instances of such feature spaced circumferentially apart as described above.

Figure 2:
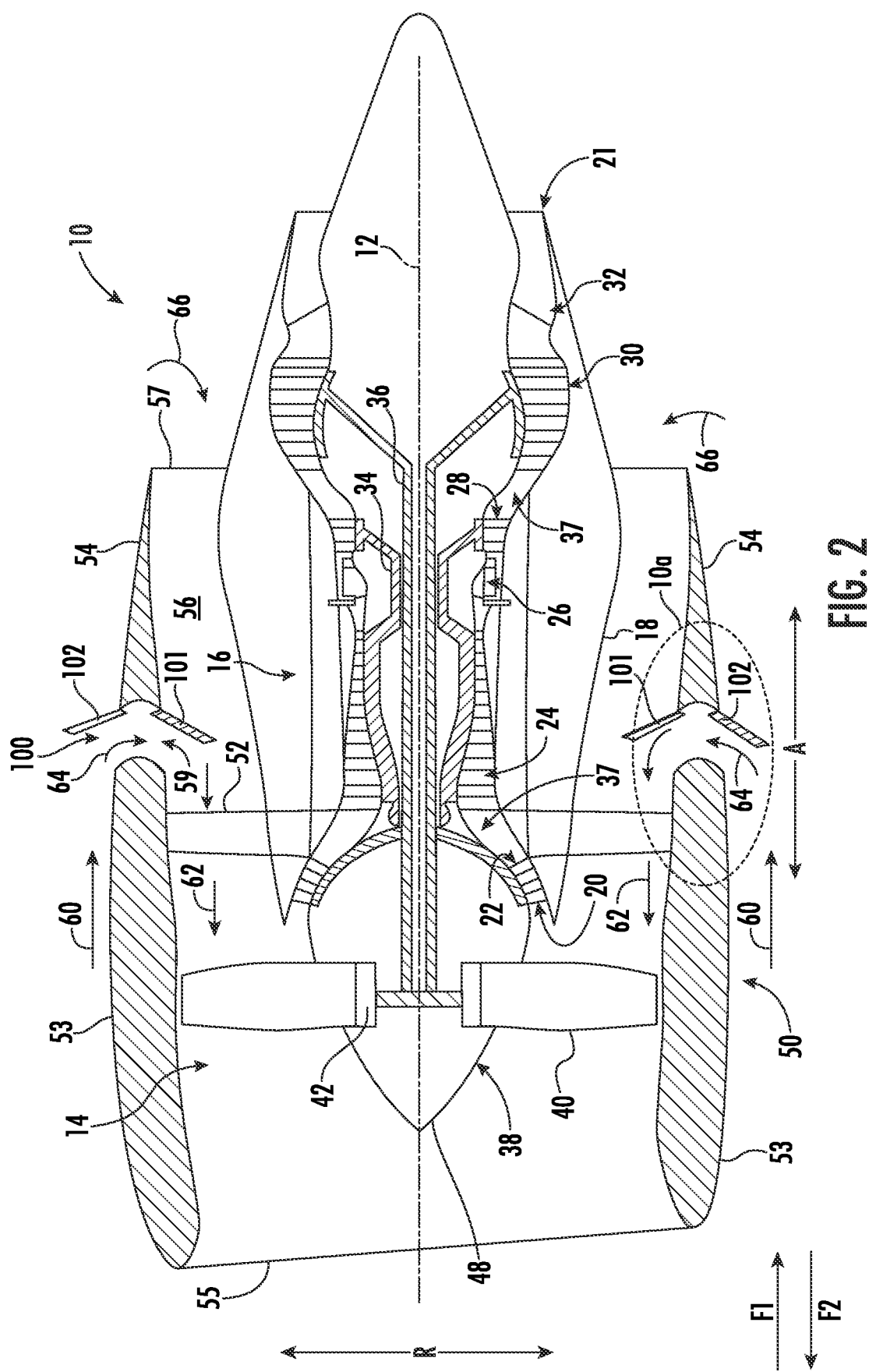
FIG. 2 is a schematic cross-sectional view of the exemplary turbofan engine of FIG. 1 in a deployed configuration.

Referring now to FIG. 2, another schematic cross-sectional view of the exemplary turbofan engine 10 of FIG. 1 is provided, with the exemplary turbofan engine 10 depicted in a deployed configuration of its flow guide assembly 100.

As used herein, the deployed configuration may be used to describe the turbofan engine 10 or specifically the flow guide assembly 100. It should be understood that the deployed configuration refers to deployment of at least part of the flow guide assembly 100 as described herein. In this deployed configuration, the turbofan engine 10 is operable in a reverse thrust mode, for example by adjusting the variable pitch fan to generate flow in the second flow direction F2 corresponding to the direction of travel. In the reverse thrust mode, flow may proceed from the aft opening 57 in the aft section 54 of the nacelle assembly 50 to the forward opening 55 in the forward section 53 of the nacelle assembly 50. Additionally or alternatively, and in particular for the embodiment depicted in FIG. 2, an intermediate opening 59 is provided between the aft opening 57 and the forward opening 55 in the axial direction A, defined by the nacelle assembly 50 when the turbofan engine 10 is in the reverse thrust mode. In the embodiment depicted in FIG. 2, the movable members 101, 102 are deployable to reveal the intermediate opening 59 disposed axially between the forward section 53 and the aft section 54 of the nacelle assembly 50. The movable members 101, 102 represent an embodiment of a flow control feature configured to redirect a fluid flow from outside the bypass passage 56 in the first flow direction F1, opposite the direction of travel, to inside the bypass passage 56 in the second flow direction F2, in the direction of travel. Accordingly, the movable members 101, 102 represent exemplary embodiments of a flow control feature configured to redirect fluid flow through the intermediate opening 59.

As shown in FIG. 2 the inner movable member 101 and the outer movable member 102 are disposed on a forward end of the aft section 54 of the nacelle assembly 50. The movable members 101, 102 are deployable from a first position in the stowed configuration of FIG. 1 in which the movable members 101, 102 connect the aft section 54 with the forward section 53 to a second position in the present deployed configuration of FIG. 2 in which the movable members 101, 102 are configured to redirect fluid flow through the intermediate opening 59. Although the movable members 101, 102 are depicted in this paired configuration, it should be appreciated that a single movable member may be configured to connect the aft section 54 with the forward section 53.

In the embodiment of FIG. 2, the movable members 101, 102 may also be referred to as deployable flow deflectors. As above, the first movable member 101 in FIGS. 1 and 2 is configured to connect an inner surface of the forward section 53 with an inner surface of the aft section 54 in the stowed configuration of FIG. 1. As used herein, the configuration to connect the forward section 53 with the aft section 54 may include mechanically connecting, bridging of a gap between, or substantially doing the same—for example to ensure smooth airflow across the forward section 53 and the aft section 54. The first movable member 101 is further configured to move in a radially inward direction relative to the centerline axis 12 (i.e., inwardly along the radial direction R towards the centerline axis 12) to reach the deployed configuration of FIG. 2. The second movable member 102 is configured to connect an outer surface of the forward section 53 with an outer surface of the aft section 54 in the stowed configuration of FIG. 1. The second movable member 102 is further configured to move in a radially outward direction relative to the centerline axis 12 (i.e., outwardly along the radial direction R away from the centerline axis 12) to reach the deployed configuration of FIG. 2.

As depicted in FIG. 2, the first movable member 101 and the second movable member 102 may each be pivotable on the aft section 54 of the nacelle assembly 50. However, it should be appreciated that the movable members 101, 102 may also be otherwise displaceable relative to the aft section 54, for example they may be translatable. In various embodiments, the movable members 101, 102 may be configured to rotate various amounts, for example thirty degrees, forty degrees, fifty, degrees, sixty degrees, seventy degrees, eighty degrees, or ninety degrees in deploying from the stowed configuration. It should be appreciated that although a single deployed configuration is shown, an amount of deployment of the movable members 101, 102 may be tunable. For example, the movable members 101, 102 may be deployed to a greater or lesser angle depending on various flow properties as described in greater detail below.

In the deployed configuration of FIG. 2, an external flow 60 is redirected by the flow guide assembly 100 to a reversed flow 62. For example, the movable members 101, 102 in the deployed configuration may at least in part act to redirect the external flow 60. In this manner, the flow guide assembly 100 may create an intermediate turning flow 64 at least partially within the intermediate opening 59. The flow guide assembly 100 employs at least one flow control feature, for example the movable members 101, 102 described above, or a tuned flow surface such as that described in greater detail with reference to FIGS. 4 and 10b. The flow guide assembly 100 and its various flow control feature(s) are tuned to facilitate efficient redirection of flow from the external flow 60 to the reversed flow 62. For example, various flow control features may be configured to prioritize smooth flow and to avoid excess momentum losses associated with the redirected intermediate turning flow 64 to effectively enable reverse thrust capability. As shown, the outer movable member 102 is deployable to capture the external flow 60, and may be configured to avoid flow separation and facilitate efficient flow turning along its surface to the forward surface of the aft section 54 (depicted in greater detail in FIG. 10a). Although the surface of the outer movable member 102 facing the external flow 60 is depicted as planar, it should be understood that various other convex, concave, or complex surface configurations may be provided to improve flow redirection.

The inner movable member 101 is configured to control the turning flow 64 passing through the intermediate opening 59. The inner movable member 101 may also have various surface configurations provided to improve flow redirection. The inner movable member 101 may also be configured to control flow from the aft opening 57 of the aft section 54. As depicted in FIG. 2, an aft turning flow 66 may be drawn into the aft opening 57 in the reverse thrust mode. The inner movable member 101 may be configured to control this flow from the aft opening 57 towards the forward opening 55, for example to minimize interference with the reversed flow 62. In an embodiment, the inner movable member 101 is configured to divide the flow from the aft opening 57 from direct interaction with the turning flow 64. For example, the inner movable member 101 may direct the aft turning flow 66 from the aft opening 57 to a radially inward location relative to the reversed flow 62, smoothly redirecting the turning flow 64 through the intermediate opening 59.

Figure 3:
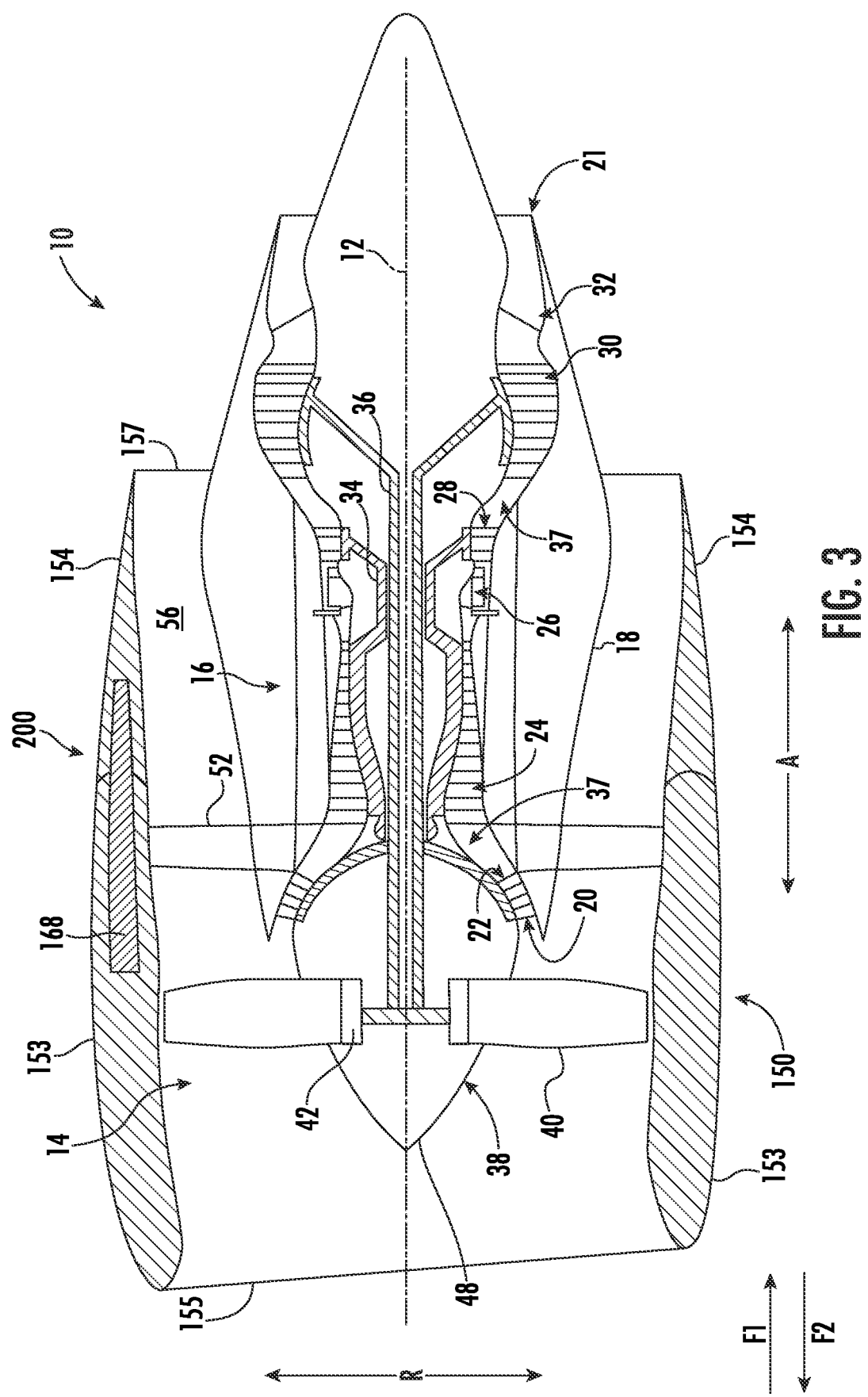
FIG. 3 is a schematic cross-sectional view of an exemplary turbofan engine in a stowed configuration according to various embodiments of the present disclosure.

Turning now to FIG. 3, a schematic cross-sectional view of a turbofan engine 10 having a flow guide assembly 200 in a stowed configuration is shown according to various embodiments of the present disclosure. The embodiment depicted in FIG. 3 differs from that in FIGS. 1 and 2 in that a nacelle support 168 is provided between a forward section 153 and an aft section 154 of a nacelle assembly 150. As shown, the nacelle support 168 is disposed at least partially between the forward section 153 and the aft section 154 and is configured to at least in part locate the forward section 153 relative to the aft section 154. It should be understood that a plurality of the nacelle support 168 may be provided circumferentially about the nacelle assembly 150, symmetrically or asymmetrically spaced apart from one another. For example, the plurality of nacelle supports 168 may be provided in equal number to features of the flow guide assembly 200 and/or spaced apart between one another as described in greater detail below. Alternatively, a single nacelle support 168 may also be provided, for example in an annular configuration with a plurality of openings (not shown) spaced circumferentially apart to facilitate operation of the flow guide assembly 200 as described in greater detail in at least FIG. 4.

As with other embodiments described herein, the depicted embodiment in FIG. 3 is configured to facilitate flow from a forward opening 155 to an aft opening 157 in the first flow direction F1 or opposite the direction of travel in the stowed configuration depicted. In this stowed configuration, the nacelle support 168 may be configured to align the forward section 153 and the aft section 154 such that smooth inner and outer surfaces are provided to control flow in the first flow direction F1 outside the nacelle assembly 150 and within the bypass passage 56, respectively.

Figure 4:
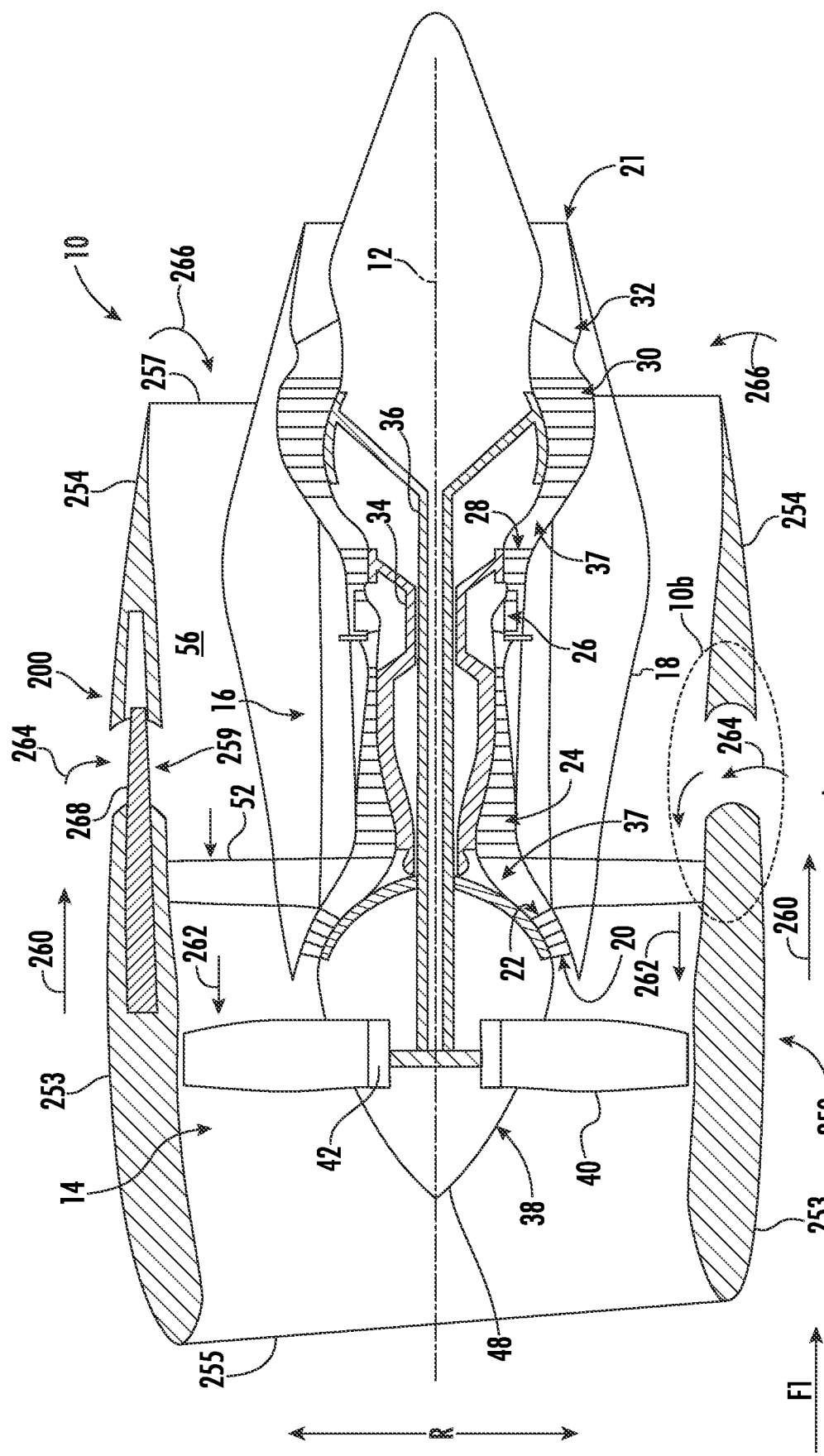
FIG. 4 is a schematic cross-sectional view of an exemplary turbofan engine in a deployed configuration according to another embodiment.

Referring now to FIG. 4, a schematic cross-sectional view of an exemplary turbofan engine in a deployed configuration is shown according to another embodiment. The embodiment of FIG. 4 generally corresponds to that shown in FIG. 3, but is depicted in the deployed configuration where a forward section 253 and an aft section 254 of a nacelle assembly 250 are spaced apart. As shown, the aft section 254 may be translated in the axial direction A aft and away from the forward section 253. However, it should also be understood that an intermediate opening 259 between the forward section 253 and the aft section 254 as depicted in FIG. 4 may be revealed without relative movement of the forward section 253 and the aft section 254, for example as provided in FIG. 2. Furthermore, it should be understood for each embodiment described herein providing an opening between an aft cowl and a fan cowl may be provided where the aft cowl is fixed axially relative to the fan cowl or where the aft cowl is movable, for example axially translatable, relative to the fan cowl. Although FIG. 4 depicts a nacelle support 268, it should also be appreciated that such an embodiment may be provided with no distinct nacelle support 268, for example by direct or unitary connection of the forward section 253 and the aft section 254. The nacelle support 268 as depicted may, for example, be omitted, with a plurality of portions (not shown) of the aft section 254 remaining fixed relative to the forward section 253, with these relatively fixed portions configured to support a plurality of relatively movable portions (not shown) disposed circumferentially therebetween.

FIG. 4 depicts the flow guide assembly 200 with one or more flow control features integrated into the nacelle assembly 250. As described herein, the one or more flow control features may be any number of components sized and shaped to control flow. For example, as shown in FIG. 4, an aft end of the forward section 253 and a forward end of the aft section 254 may be contoured to redirect an external flow 260 through a turning flow 264 in the intermediate opening 259 and to a reversed flow 262 flowing in a substantially opposite direction to the external flow 260. Accordingly, in the depicted deployed configuration of FIG. 4, the flow guide assembly 200 is configured to flow fluid in the second flow direction F2 or in the direction of travel out a forward opening 255 of the forward section 253. Also shown in FIG. 4, an aft turning flow 266 may feed a flow in the second flow direction F2 from an aft opening 257 of the aft section 254. As will be described in greater detail below with reference to FIG. 10b, depicted an enlarged view of the flow guide assembly 200 of FIG. 4, the flow guide assembly 200 may be configured with various flow control features to control the intermediate turning flow 264 in the intermediate opening 259, the flow from the aft opening 257 to the forward opening 255, and/or an interaction between these flows.

Figure 5:
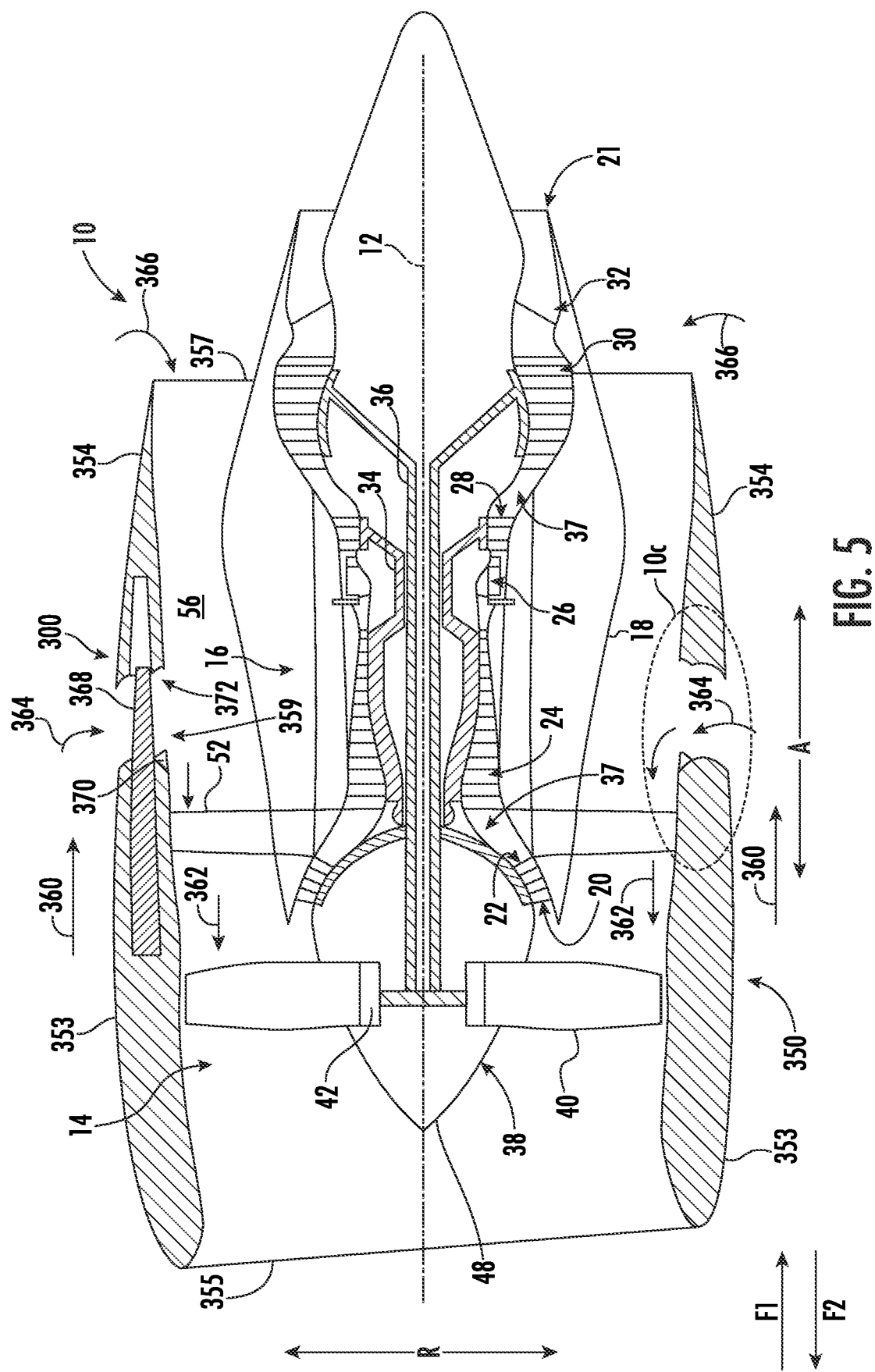
FIG. 5 is a schematic cross-sectional view of an exemplary turbofan engine in a deployed configuration according to another embodiment.

Turning now to FIG. 5, another embodiment of a flow guide assembly 300 disposed between a forward section 353 and an aft section 354 of a nacelle assembly 350 is provided. The flow guide assembly 300 is shown in the deployed configuration for operation in the reverse thrust mode. As depicted, the flow guide assembly 300 is configured to flow fluid in the second flow direction F2 or in the direction of travel out a forward opening 355 of the forward section 353. An intermediate opening 359 is provided between the forward section 353 and the aft section 354 to facilitate redirection of flow from an external flow 360, through an intermediate turning flow 364 controlled by the flow guide assembly 300 and to a reversed flow 362 out through the forward opening 355. Also shown in FIG. 5, an aft turning flow 366 may feed a flow in the second flow direction F2 from an aft opening 357 of the aft section 354. Although FIG. 5 depicts a nacelle support 368, it should also be appreciated that such an embodiment may be provided with no distinct nacelle support 368, for example by direct or unitary connection of the forward section 353 and the aft section 354 as described above.

As will be described in greater detail with reference to FIG. 10c below, the embodiment of FIG. 5 includes at least one surface feature 370 disposed on a surface of the flow guide assembly 300. As depicted, the at least one surface feature 370 is disposed on the aft end of the forward section 353. However, it should be understood that various surface features 370 may be including on other surfaces, for example a forward surface of the aft section 354. It should be appreciated that the at least on surface feature 370 may be disposed at various upstream or downstream positions along the flow guide assembly 300. As described in greater detail with reference to FIGS. 10c and 12, the surface features may comprise any combinations of chevrons, mechanical vortex generators, lip tubercles, or other flow control feature configurations. The surface features 370 may be configured to remove a portion of the external flow 360, thus delaying local flow separation and aerodynamic stalling. In at least this way, the surface features 370 can act to redirect flow through the flow guide assembly 300.

The at least one surface feature 370 may be configured such that it is exposed in the deployed configuration depicted in FIG. 5 but concealed in a stowed configuration. As shown in FIG. 5 at least one nesting feature 372 may be provided to facilitate concealment of the at least one surface feature 370. As depicted, the at least one nesting feature 372 is provided opposite the at least one surface feature 370, in this case being disposed on the forward end of the aft section 354. It should be understood that, according to the various embodiments of surface features 370, corresponding embodiments of the nesting features 372 may be provided to compactly cover corresponding ones of the surface features 370. In an embodiment, a plurality of surface features 370 and a corresponding plurality of nesting features 372 may be provided circumferentially about the nacelle assembly 350. The plurality of surface features 370 may be spaced apart circumferentially symmetrically or asymmetrically in any number. In various embodiments, a quantity of the plurality of surface features 370 corresponds to a quantity of the outlet guide vanes 52. For example, the plurality of surface features 370 may be provided in a quantity equal to the quantity of outlet guide vanes 52 or as a ratio for example 1:2 or 2:1 relative to the quantity of outlet guide vanes 52. It should also be appreciated that the quantity of surface features 370 may be arbitrary in relation to the quantity of outlet guide vanes 52.

Figure 6:
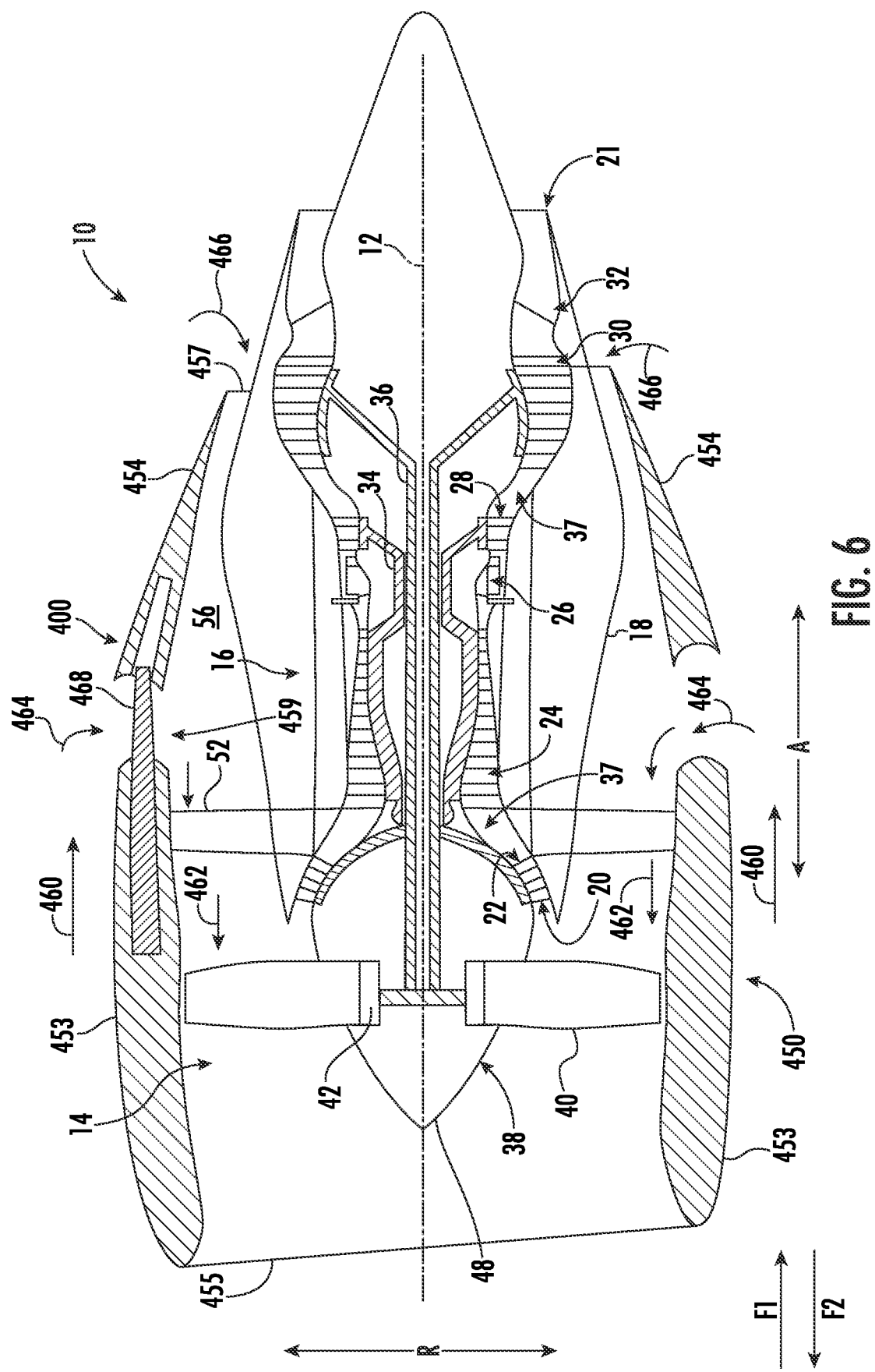
FIG. 6 is a schematic cross-sectional view of an exemplary turbofan engine in a deployed configuration according to another embodiment.

Turning now to FIG. 6, another embodiment of a flow guide assembly 400 disposed between a forward section 453 and an aft section 454 of a nacelle assembly 450 is provided. The flow guide assembly 400 is shown in the deployed configuration for operation in the reverse thrust mode. As depicted, the flow guide assembly 400 is configured to flow fluid in the second flow direction F2 or in the direction of travel out a forward opening 455 of the forward section 453. An intermediate opening 459 is provided between the forward section 453 and the aft section 454 to facilitate redirection of flow from an external flow 460, through an intermediate turning flow 464 controlled by the flow guide assembly 400 and to a reversed flow 462 out through the forward opening 455. Also shown in FIG. 6, an aft turning flow 466 may feed a flow in the second flow direction F2 from an aft opening 457 of the aft section 454. Although FIG. 6 depicts a nacelle support 468, it should also be appreciated that such an embodiment may be provided with no distinct nacelle support 468, for example by direct or unitary connection of the forward section 453 and the aft section 454 as described above.

In the embodiment of FIG. 6, the aft section 454 is configured to deploy to control flow through the aft opening 457. As compared with, e.g. FIG. 3, it can be seen that the aft opening 457 of FIG. 6 is reduced in area to control flow as part of the flow guide assembly 400. By adjusting or limiting flow through the aft opening 457, the flow guide assembly 400 can control interference with the turning flow 464 and the reversed flow 462 as described above with reference to FIG. 2. However, in contrast with FIG. 2, the flow guide assembly 400 of FIG. 6 uses the control of the aft opening 457 as a control mechanism rather than the inner movable member 101 (see FIG. 2). It should be appreciated, however, that these embodiments may be combined to provide alternative or additional mechanisms for flow control.

The aft section 454 is shown as pivotable about a location on the nacelle support 468. However, it should also be appreciated that the nacelle support 468 itself or the forward section 453 may also be pivotable to achieve deployment of the aft section 454. As with other embodiments described herein, it should be appreciated that the pivotable aft section 454 may be pivotable only in part, for example with interspersed pivotable and non-pivotable portions disposed circumferentially between one another. It should also be understood that the aft section 454 may be pivotable such that its forward end is moveable radially outwards while its aft end is movable radially inwards to the deployed configuration.

Figure 7:
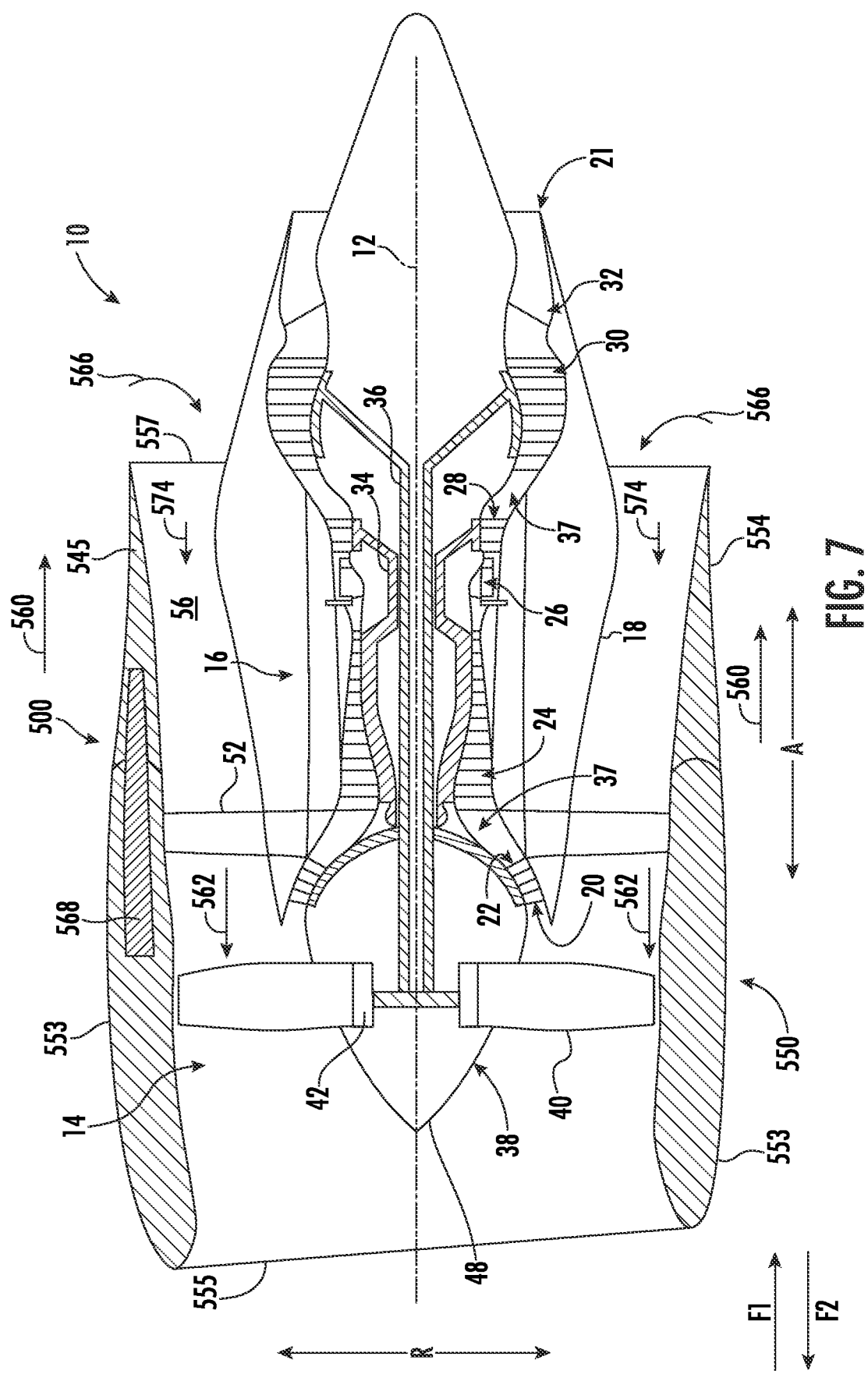
FIG. 7 is a schematic cross-sectional view of an exemplary turbofan engine in a deployed configuration according to another embodiment.

Turning now to FIG. 7, another embodiment of a flow guide assembly 500 disposed between a forward section 553 and an aft section 554 of a nacelle assembly 550 is provided. The forward section 553 defines a forward opening 555 and the aft section 545 The flow guide assembly 500 is shown in another embodiment of a deployed configuration for operation in the reverse thrust mode. As depicted, the flow guide assembly 500 is configured to flow fluid in the second flow direction F2 or in the direction of travel out a forward opening 535 of the forward section 553. Although no intermediate opening is provided between the forward section 553 and the aft section 554 it should be appreciated that this feature could be combined with those described in reference to the embodiment of FIG. 7. Although FIG. 7 depicts a nacelle support 568, it should also be appreciated that such an embodiment may be provided with no distinct nacelle support 568, for example by direct or unitary connection of the forward section 553 and the aft section 554 as described above.

As shown in FIG. 7, an aft turning flow 566 may feed an enhanced flow 574 in the second flow direction F2 from an aft opening 557 of the aft section 554. This enhanced flow 574 is shown as fed by an external flow 560 by way of the aft turning flow 566. In this embodiment, the aft opening 557 is configured to expand in area in the deployed configuration for operation in the reverse thrust mode. As depicted, in comparison with FIG. 1 or 3, the aft section 554 may be deformable to provide this enhanced flow 574 in the reverse thrust mode. For example, at least a portion of the aft section 554 may be formed of a flexible material or otherwise compliant structure such as described in U.S. Patent Application Publication No. 2019/0061910, having U.S. patent application Ser. No. 16/079,369, which is hereby incorporated by reference in its entirety. As further shown in FIG. 7, the enhanced flow can thereby provide a reversed flow 562 out of the forward opening 555 in the reverse thrust mode.

Through deformation of the deformable aft section 554, this aft section 554 is movable between a first position corresponding to the forward thrust mode, wherein the aft opening 557 is of a first size; and a second position corresponding to the reverse thrust mode, as depicted in FIG. 7 and in which the aft opening 557 is of a second size greater than the first size. In various embodiments, the second size of the aft opening 557 may have a cross-sectional area ten percent, fifteen percent, twenty percent, twenty-five percent, or thirty percent greater than a cross-sectional area of the first size of the aft opening 557. In some embodiments, the second size of the aft opening 557 may be no more than one hundred percent, seventy-five percent, or fifty percent greater in cross-sectional area than the first size of the aft opening 557.

The embodiment of FIG. 7 may include a plurality of deformable members (not shown) of the aft section 554. For example, the aft section 554 may be divided circumferentially between deformable and non-deformable sections, where only the deformable sections are configured to expand an area of the aft opening 557 as shown in FIG. 7. It should be appreciated that mechanical features (not shown) may be disposed within a deformable material to control deployment of the portion of the aft opening 557 working as part of the flow guide assembly 500. The deformable material (not shown) may be configured to provide sealing against adjacent mechanical features or stationary components of the aft section 554.

Figure 8:
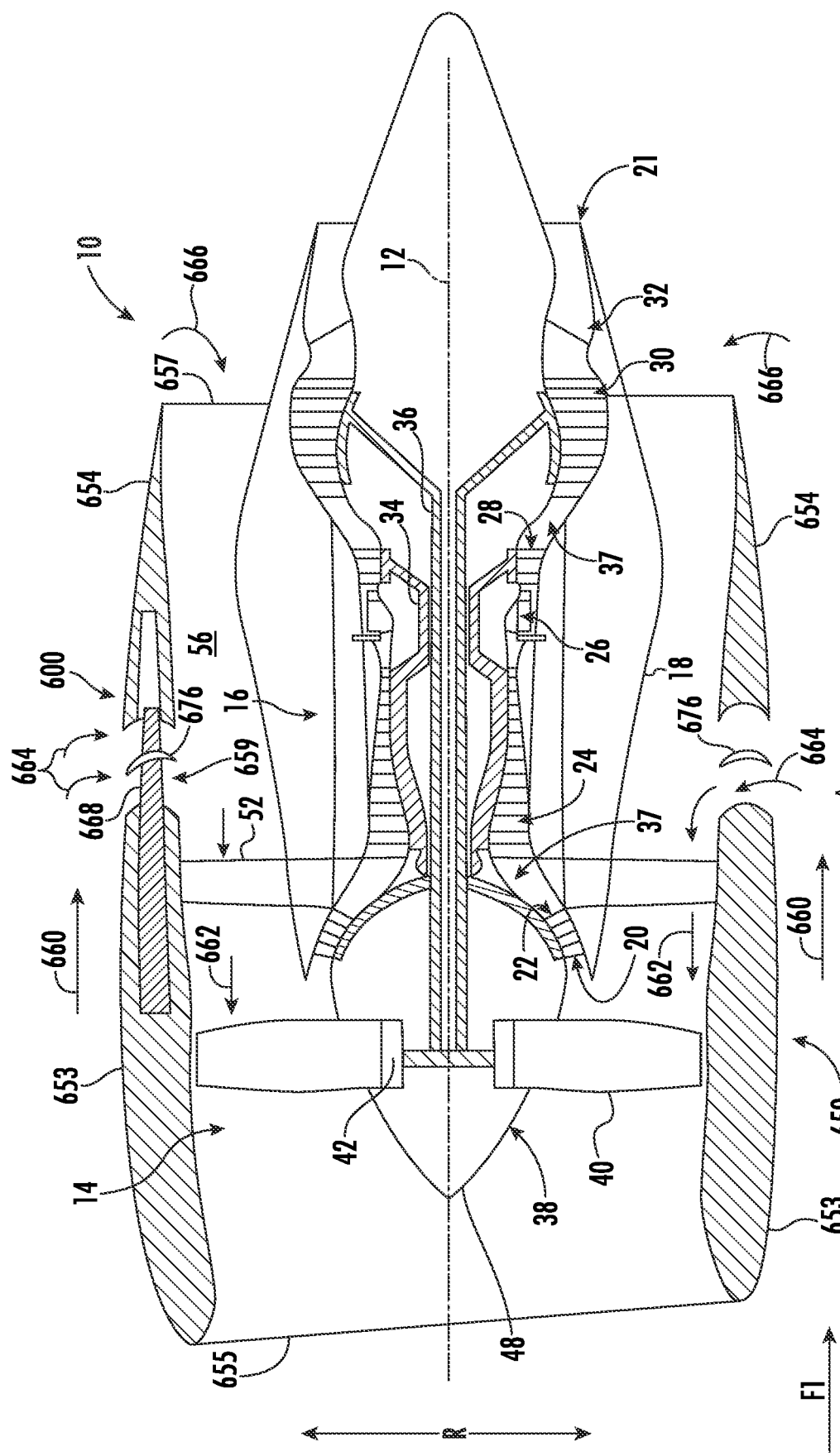
FIG. 8 is a schematic cross-sectional view of an exemplary turbofan engine in a deployed configuration according to another embodiment.

Turning now to FIG. 8, another embodiment of a flow guide assembly 600 disposed between a forward section 653 and an aft section 654 of a nacelle assembly 650 is provided. The flow guide assembly 600 is shown in the deployed configuration for operation in the reverse thrust mode. As depicted, the flow guide assembly 600 is configured to smoothly and efficiently direct flow through an intermediate opening 659 and toward the second flow direction F2 or in the direction of travel out a forward opening 655 of the forward section 653. The intermediate opening 659 is provided between the forward section 653 and the aft section 654 to facilitate redirection of flow from an external flow 660, through an intermediate turning flow 664 controlled by the flow guide assembly 600 and to a reversed flow 662 out through the forward opening 655. Also shown in FIG. 8, an aft turning flow 666 may feed a flow in the second flow direction F2 from an aft opening 657 of the aft section 654. Although FIG. 8 depicts a nacelle support 668, it should also be appreciated that such an embodiment may be provided with no distinct nacelle support 668, for example by direct or unitary connection of the forward section 653 and the aft section 654 as described above.

As depicted in FIG. 8, the flow guide assembly 600 may include at least one flow control vane 676 disposed in the intermediate opening 659. For example, a plurality of flow control vanes 676 may be aligned along the axial direction A within the intermediate opening 659. The flow control vane(s) 676 may be configured to nest with one another and/or corresponding features of the forward section 653 and the aft section 654 when moved to the stowed configuration. The flow control vane(s) 676 may also be pivotable about an axis, for instance to control an angle of attack to facilitate control of the intermediate turning flow 664. As shown in FIG. 8, the flow control vane(s) 676 may be fixed, rotatably or not, to the nacelle support 668. Alternatively or additionally, the flow control vane(s) 676 may be supported, for example on a control rod (not shown) keyed or otherwise fixed to the flow control vane(s) 676, wherein the control rod (not shown) is supported between spaced apart portions of the nacelle assembly 650.

The plurality of flow control vanes 676 may be spaced apart circumferentially symmetrically or asymmetrically in any number. In various embodiments, a quantity of the flow control vanes 676 corresponds to a quantity of the outlet guide vanes 52. For example, the flow control vanes 676 may be provided in a quantity equal to the quantity of outlet guide vanes 52 or as a ratio for example 1:2 or 2:1 relative to the quantity of outlet guide vanes 52.

Figure 9:
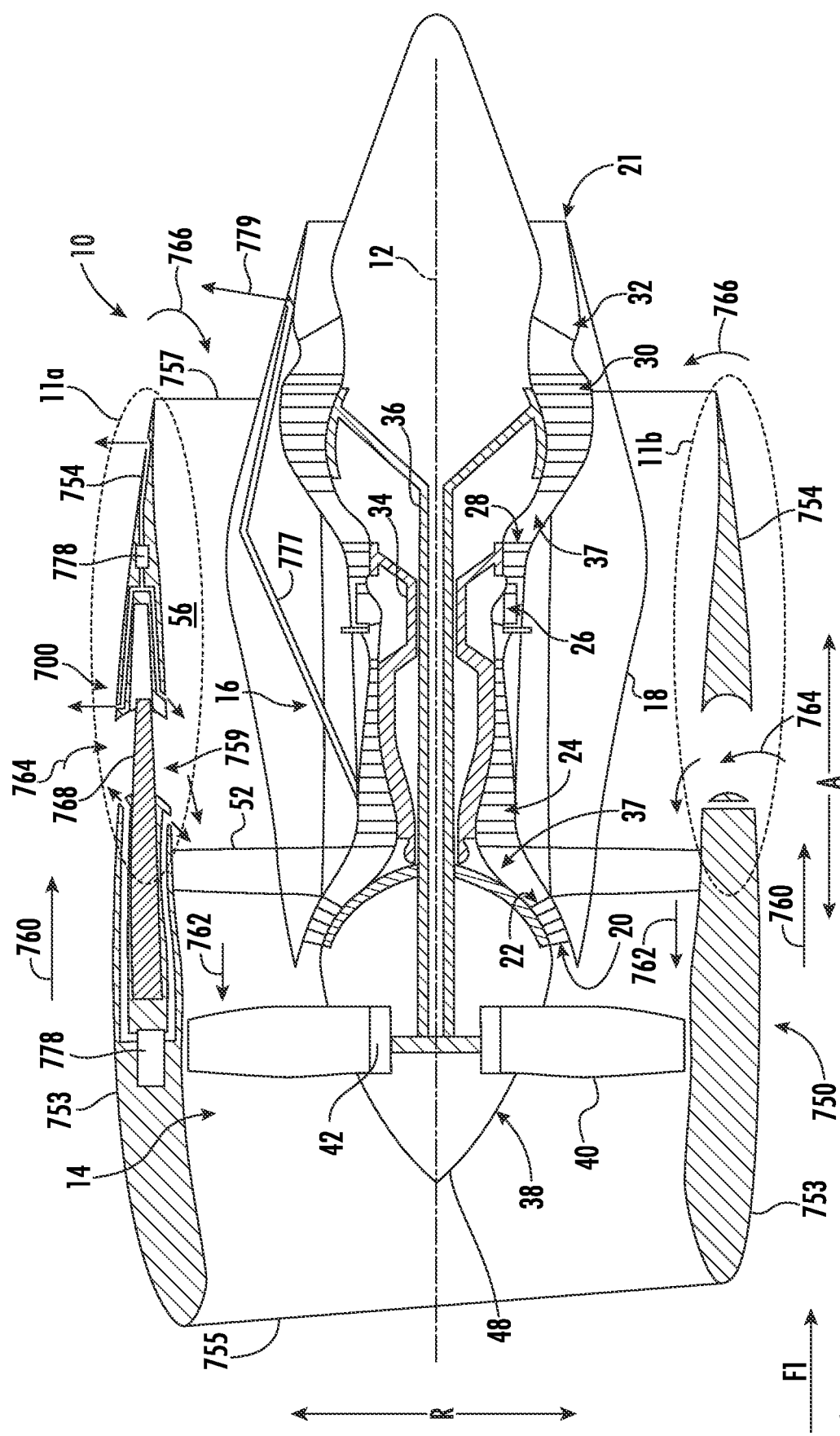
FIG. 9 is a schematic cross-sectional view of an exemplary turbofan engine in a deployed configuration according to another embodiment.

Turning now to FIG. 9, another embodiment of a flow guide assembly 700 disposed between a forward section 753 and an aft section 754 of a nacelle assembly 750 is provided. The flow guide assembly 700 is shown in the deployed configuration for operation in the reverse thrust mode. As depicted, the flow guide assembly 700 is configured to flow fluid in the second flow direction F2 or in the direction of travel out a forward opening 755 of the forward section 753. An intermediate opening 759 is provided between the forward section 753 and the aft section 754 to facilitate redirection of flow from an external flow 760, through an intermediate turning flow 764 controlled by the flow guide assembly 700 and to a reversed flow 762 out through the forward opening 755. Also shown in FIG. 9, an aft turning flow 766 may feed a flow in the second flow direction F2 from an aft opening 757 of the aft section 754. Although FIG. 9 depicts a nacelle support 768, it should also be appreciated that such an embodiment may be provided with no distinct nacelle support 768, for example by direct or unitary connection of the forward section 753 and the aft section 754 as described above.

As shown in FIG. 9, the flow guide assembly 700 may include one or more outflow features (see FIG. 11a). These outflow features (not shown) may be fed by a pressurized supply, for example from the turbomachine 16, also referred to herein as a core. As above, it should be appreciated that a core may also be partially or entirely electrically-driven. The pressurized supply may be chosen based on a required pressure to operate a given outflow feature as described in greater detail with reference to FIG. 11a. In an embodiment, bleed air may be provided to the outflow features (not shown) from along the core air flowpath 37, for example from the HP compressor 24 in one or more of a flow channel 777. The flow channel(s) 777 may be tunable to control mass flow and pressure to a given outflow feature as described in greater detail with reference to FIG. 11a. One or more of a flow supply 778 may be provided to feed the flow channels 777. For example, a plurality of flow supplies 778 may be provided to feed connected or branched flow channels 777 and may be further configured to control flow to one or more flow channels 777, for example with one or more valves.

An exemplary outflow from the flow channels 777 is provided in FIG. 9 with a core outflow 779. The core outflow 779 may be configured to provide relatively high pressure flow to entrain flow and facilitate redirection of the external flow 760 to the aft turning flow 766. Thus, the core outflow 779 may function as a fluidic injection component and/or an air curtain component of the flow guide assembly 700 to redirect flow. As described herein, core outflows may generally be referred to as fluidic injections. Various fluidic injections as described below may function as air curtains, flow guides, vortex generators, etc.

Figure 10A:
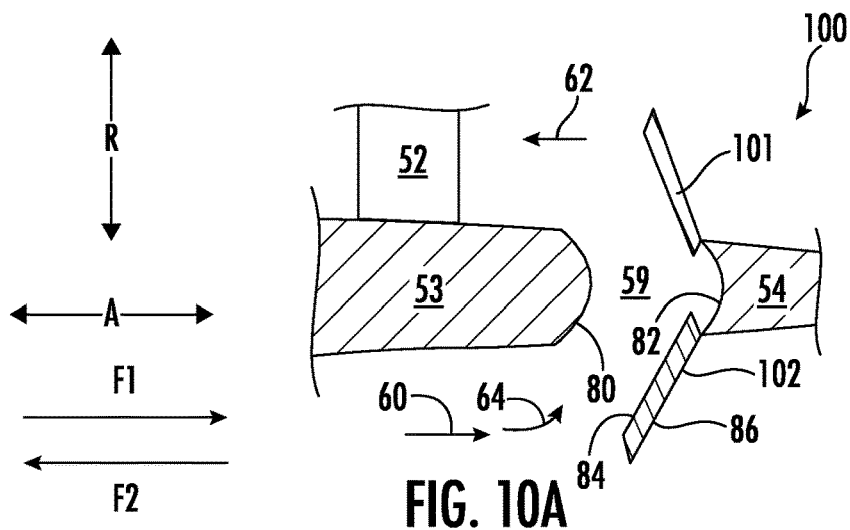
FIG. 10a is an enlarged view of the exemplary turbofan engine of FIG. 2.
Figure 10B:
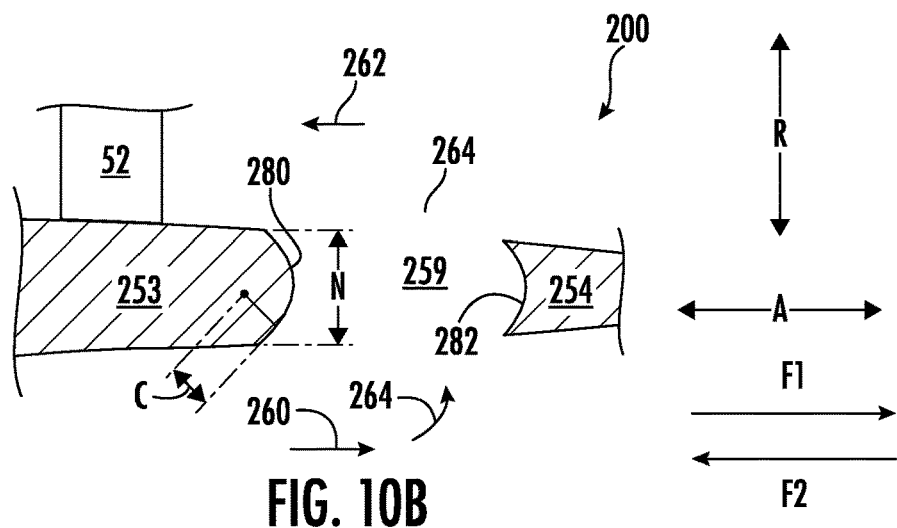
FIG. 10b is an enlarged view of the exemplary turbofan engine of FIG. 4.

Turning now to FIG. 10a, the embodiment of the flow guide assembly 100 of FIG. 2 is shown in greater detail. As shown, the forward section 53 includes a first flow control surface 80 and the aft section 54 includes a second flow control surface 82. In an embodiment, the first flow control surface 80 and the second flow control surface 82 may be configured to nest with one another for stowage in the forward thrust mode, for example as shown in FIGS. 1 and 3. As described in greater detail below with reference to FIG. 10b, the flow control surfaces 80, 82 may be sized and shaped to redirect flow through the intermediate opening 59, for example by avoiding flow separation.

The movable members 101, 102 are each shown to include opposite control surfaces. As noted in FIG. 10a with respect to the inner movable member 101, an intermediate control surface 84 is provided facing the intermediate opening 59 and an aft control surface 86 is provided facing the aft opening 57 (see FIG. 2). As described in FIG. 2, the intermediate control surface 84 may be configured to control the intermediate turning flow 64 and the aft control surface 86 may be configured to control flow from the aft opening 57 (see FIG. 2). It should also be appreciated, that in the stowed configuration (see FIG. 1), the aft control surface 86 may also function to connect the forward section 53 and the aft section 54 of the nacelle assembly 50.

Turning now to FIG. 10b, the embodiment of the flow guide assembly 200 of FIG. 4 is shown in greater detail. As shown, the forward section 253 includes a first flow control surface 280 and the aft section 254 includes a second flow control surface 282. The flow control surfaces 280, 282 may be sized and shaped to control flow through the intermediate opening 259 as described above with reference to FIG. 10a. For example, as shown in FIG. 10b, the first flow control surface 280 may have a specific curvature relative to dimensions of the forward section 253. As shown, the forward section 253 defines a nacelle thickness N. The first flow control surface 280 defines a radius of curvature C. The radius of curvature C may be constant or variable and is a tunable feature to redirect and control flow. In various embodiments, the minimum radius of curvature C may be less than the half the nacelle thickness N, for example less than fifty percent, forty percent, thirty percent, or twenty percent of the nacelle thickness N. It should be appreciated that the second flow control surface 282 may be similarly tunable and may further be sized and shaped to compactly mate with the first flow control surface 280 in a stowed configuration. As shown, the first flow control surface 280 is a convex surface complementary to the concave surface of the second flow control surface 282

Figure 10C:
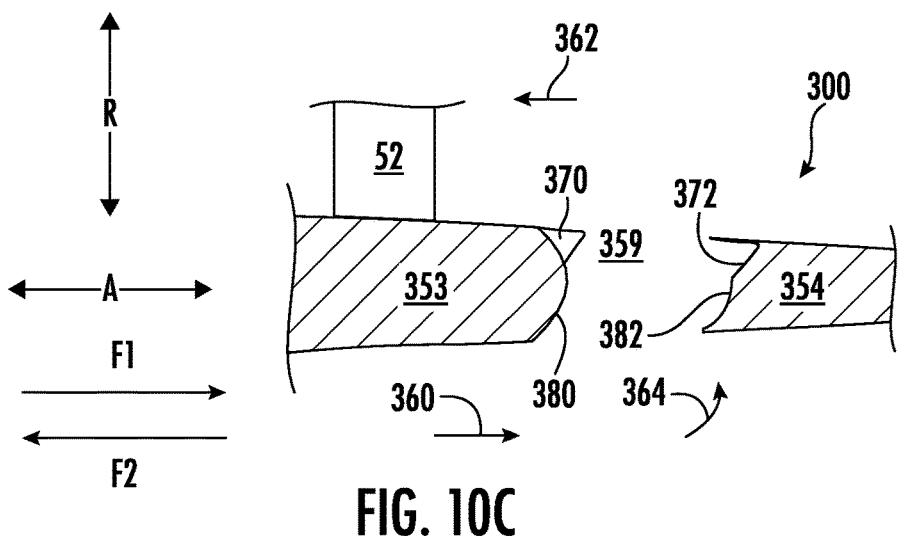
FIG. 10c is an enlarged view of the exemplary turbofan engine of FIG. 5.

Turning now to FIG. 10c, the embodiment of the flow guide assembly 300 of FIG. 5 is shown in greater detail. As shown in FIG. 10c, the surface feature 370 may be sized and shaped to compactly mate with the nesting feature 372 in a stowed configuration. It should be understood that the nesting feature 372 may be configured to avoid flow interruption in or around the intermediate opening 359. For example, a cover 373 may be provided over the nesting feature 372. As shown, the cover 373 may facilitate smooth flow in the stowed configuration. Additionally or alternatively, the surface feature 370 may be sized and shaped to facilitate smooth flow in the stowed configuration. It should be appreciated that, for example with circumferentially spaced apart surface features 370, a combination of surface features 370 and covers 373 may cooperate to facilitate smooth flow in the stowed configuration.

The surface feature 370 and/or the nesting feature 372 may be disposed on a first flow control surface 380 and a second flow control surface 382, for example those described above with reference to FIG. 10b. In this way, the surface feature(s) 370 may provide additional flow turning capability to the flow control surfaces 380, 382.

Turning now to FIG. 11a, an enlarged view of the embodiment of FIG. 9 is shown. As with the core outflow 779 described in FIG. 9, various other outflows may be provided for flow control purposes, working together as components of the flow guide assembly 700. For example, an aft nacelle outflow 780 may be provided near a trailing edge of the aft section 754. The aft nacelle outflow 780 is configured to inject air into the external flow 760. For example, the aft nacelle outflow 780 may be operable as a fluidic vortex generator configured to redirect and control the external flow 760 to the aft turning flow 766. In such a manner, the aft nacelle outflow 780 may effectively improve the turning radius of the aft turning flow 766 in such a manner to reduce or eliminate the potential for flow separation in bypass passage 56.

One or more intermediate outflows may also be provided. As shown in FIG. 11a, a first aft intermediate outflow 782 is provided flowing outside of the aft section 754 near the intermediate opening 759. The first aft intermediate outflow 782 may be configured to entrain the external flow 760, for example as described with reference to the core outflow 779 described with reference to FIG. 9. In this manner, the first aft intermediate outflow 782 may be operable as an air curtain or similar to redirect and control the external flow 760 to the intermediate turning flow 764. A second aft intermediate outflow 784 is provided flowing into the bypass passage 56. The second aft intermediate outflow 784 may be configured to entrain the intermediate turning flow 764, also operable as an air curtain to facilitate redirection or maintain a direction of the intermediate turning flow 764. Additionally or alternatively, the second aft intermediate outflow 784 may be operable to control flow from the bypass passage 56 in the second flow direction F2. In this manner, the second aft intermediate outflow 784 may be operable as a fluidic analogue to the first movable member 101 described with reference to FIG. 2.

A first forward intermediate outflow 786 may also be provided. As shown, the first forward intermediate outflow 786 may provide air injection near the intermediate opening 759 from the forward section 753 and outwards towards the external flow 760. The first forward intermediate outflow 786 may be operable as a fluidic vortex generator, for example analogous operation of the aft nacelle outflow or the surface feature 370. In such a manner, the first forward intermediate outflow 786 may effectively increase a turning radius of the intermediate turning flow 764. A second forward intermediate outflow 788 may also be provided. As shown, the second forward intermediate outflow 788 may provide air injection into the bypass passage 56 near the intermediate opening 759. The second forward intermediate outflow 788 may provide a relatively high flow, low pressure area to facilitate redirection of the intermediate turning flow 764.

It should be appreciated that the various outflows 779, 780, 782, 784, 786, 788 may cooperate with one another to control and/or redirect airflow as components of the flow guide assembly 700. For example, the first aft intermediate outflow 782, second aft intermediate outflow 784, first forward intermediate outflow 786, and/or the second forward intermediate outflow 788 may cooperate with one another to redirect the external flow 760 through the intermediate turning flow 764 and to the reversed flow 762. The core outflow 779 (see FIG. 9) and the aft nacelle outflow 780 may cooperate with one another to redirect the external flow 760 through the aft turning flow 766 and to the reversed flow 762. As described above, the first aft intermediate outflow 782, second aft intermediate outflow 784, first forward intermediate outflow 786, and/or the second forward intermediate outflow 788 may also cooperate with one another to control interaction with the intermediate turning flow 764 and the reversed flow 762 from the aft opening 757 (see FIG. 9).

Turning now to FIG. 11b, an enlarged view of the embodiment of FIG. 9 is shown. In the embodiment shown, a flow through channel 790 is provided. As depicted, the flow through channel 790 is provided in the forward section 753, but it should be understood that the flow through channel 790 may also be provided in other portions of the nacelle assembly 750. The flow through a plurality of the flow through channels 790 includes channel inlets 792 configured to flow air from the external flow 760 through the flow through channels 790 and to channel outlets 794 to the bypass passage 56. This configuration may be described as an array of fluidic vortex generators. In comparison to the second forward intermediate outflow 788 of FIG. 11a above, the channel outlet 794 may provide a relatively low pressure fluid injection into the flow and may similarly function to increase an effective turning radius of the intermediate turning flow 764. It should be understood that a plurality of flow through channels 790 may be provided tunable to desired flow characteristics.

Turning now to FIG. 12, another embodiment of a flow guide assembly 800 disposed between a forward section 853 and an aft section 854 of a nacelle assembly 850 is provided. The flow guide assembly 800 is shown in the deployed configuration for operation in the reverse thrust mode. As depicted, the flow guide assembly 800 is configured to flow fluid in the second flow direction F2 or in the direction of travel out a forward opening 855 of the forward section 853. An intermediate opening 859 is provided between the forward section 853 and the aft section 854 to facilitate redirection of flow from an external flow 860, through an intermediate turning flow 864 controlled by the flow guide assembly 800 and to a reversed flow 862 out through the forward opening 855. Also shown in FIG. 12, an aft turning flow 866 may feed a flow in the second flow direction F2 from an aft opening 857 of the aft section 854.

As shown in FIG. 12, a plurality of flow control features 870 may be provided to control the intermediate turning flow 864. As depicted, the plurality of flow control features 870 comprise a lip tubercle configuration. For example, a surface of grooves, lips, steps, or tubercles may be provided. It should be understood that the flow control features may be similarly tuned as described above with reference to the surface features 370. As shown in FIG. 10c with respect to the surface feature 370 and the nesting feature 372, it should be appreciated that a plurality of nesting features (not shown) may also be provided for the lip tubercle configuration depicted in FIG. 12 to provide compact mating in a stowed configuration.

Figure 13:
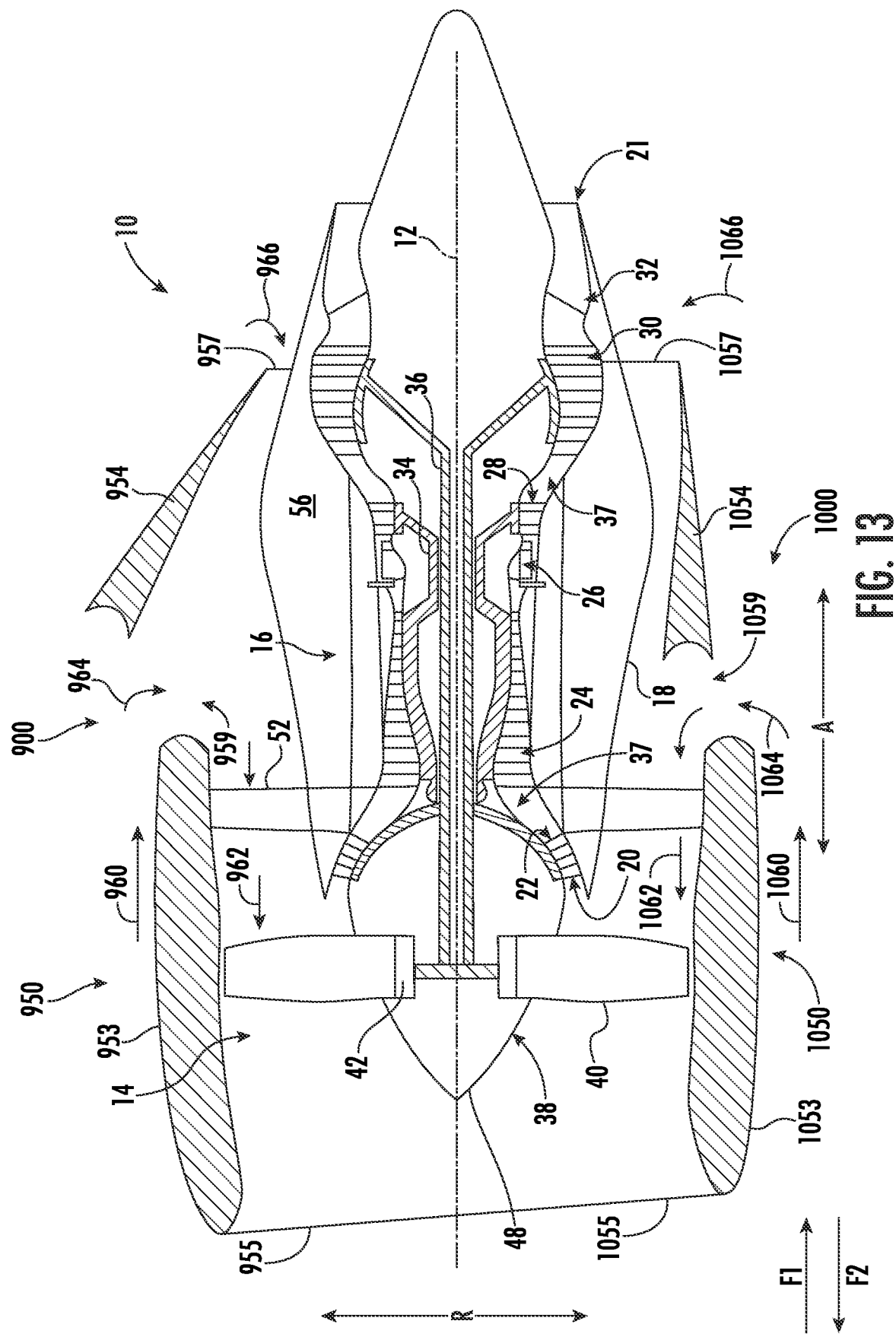
FIG. 13 is a schematic cross-sectional view of an exemplary turbofan engine according to one or more further embodiments.

Turning now to FIG. 13, further embodiments of a flow guide assembly 900, 1000 are provided. Above the centerline axis 12 on the page, a first embodiment of the flow guide assembly 900 is provided. Below the centerline axis 12 on the page, a second embodiment of the flow guide assembly 1000 is provided. However, it should be appreciated that the embodiments shown in FIG. 13, as well as those from other figures herein, may be combined, for example to provide a cross-sectional schematic as shown above and below the centerline axis 12 on the page in FIG. 13.

The embodiment of the flow guide assembly 900 depicted in the top portion of the page of FIG. 13 is disposed between a forward section 953 and an aft section 954 of a nacelle assembly 950. As with other embodiments, it should be appreciated that portions of the nacelle assembly 950, such as those spaced circumferentially between movable portions of the flow guide assembly 900, are omitted for clarity. The flow guide assembly 900 is shown in the deployed configuration for operation in the reverse thrust mode. As depicted, the flow guide assembly 900 is configured to flow fluid in the second flow direction F2 or in the direction of travel out a forward opening 955 of the forward section 953. An intermediate opening 959 is provided between the forward section 953 and the aft section 954 to facilitate redirection of flow from an external flow 960, through an intermediate turning flow 964 controlled by the flow guide assembly 900 and to a reversed flow 962 out through the forward opening 955. Also shown in FIG. 13, an aft turning flow 966 may feed a flow in the second flow direction F2 from an aft opening 957 of the aft section 954. Although FIG. 13 does not depict a nacelle support, it should also be appreciated that such an embodiment may be provided with a distinct nacelle support (not shown), for example as described above with reference to FIGS. 3-9.

In the present embodiment of FIG. 13, the aft section 954 is configured to deploy to control flow through the aft opening 957. As compared with, e.g. FIG. 3, it can be seen that the aft opening 957 of FIG. 13 is reduced in area to control flow as part of the flow guide assembly 900. By adjusting or limiting flow through the aft opening 957, the flow guide assembly can control interference with the intermediate turning flow 964 and the reversed flow 962 as described above with reference to FIG. 2. Additionally, as described with relation to FIG. 6, the flow guide assembly 900 of FIG. 13 uses the control of the aft opening 957 as a flow control mechanism. In contrast with the embodiment of FIG. 6, the present embodiment further controls the aft section 954 to extend beyond the forward section 953 of the nacelle assembly 950. In doing so, the aft section 954 may be operable as a scoop or air-turning feature to redirect the intermediate turning flow to the intermediate opening 959. In certain embodiments, the aft section 954 may be deployable such that it is the radially outermost portion of the nacelle assembly 950. For example, the aft section 954 may deploy such that, along the radial direction R, at least a portion of the aft section 954 is spaced apart from at least an adjacent portion of the forward section 953, as depicted in FIG. 13.

Turning now to the embodiment of the flow guide assembly 1000 depicted in the bottom portion of the page of FIG. 13, the flow guide assembly 1000 is disposed between a forward section 1053 and an aft section 1054 of a nacelle assembly 1050. The flow guide assembly 1000 is shown in the deployed configuration for operation in the reverse thrust mode. As depicted, the flow guide assembly 1000 is configured to flow fluid in the second flow direction F2 or in the direction of travel out a forward opening 1055 of the forward section 1053. An intermediate opening 1059 is provided between the forward section 1053 and the aft section 1054 to facilitate redirection of flow from an external flow 1060, through an intermediate turning flow 1064 controlled by the flow guide assembly 1000 and to a reversed flow 1062 out through the forward opening 1055. Also shown in FIG. 13, the aft turning flow 1066 may feed a flow in the second flow direction F2 from an aft opening 1057 of the aft section 1054. Although FIG. 13 does not depict a nacelle support, it should also be appreciated that such an embodiment may be provided with a distinct nacelle support (not shown), for example as described above with reference to FIGS. 3-9.

In the present embodiment of FIG. 13, the aft section 1054 is configured to deploy to control flow through the aft opening 1057. As compared with, e.g. FIG. 3, it can be seen that the aft opening 1057 of FIG. 13 is reduced in area to control flow as part of the flow guide assembly 1000. By adjusting or limiting flow through the aft opening 1057, the flow guide assembly 1000 can control interference with the intermediate turning flow 1064 and the reversed flow 1062 as described above with reference to FIG. 2. Additionally, as described with relation to FIG. 6 and the upper portion of the page in FIG. 13 as described above, the flow guide assembly 1000 of FIG. 13 uses the control of the aft opening 1057 as a flow control mechanism. In contrast with the embodiment of the upper portion of the page in FIG. 13, the present embodiment further controls the aft section 1054 to retract radially inward relative the forward section 1053 of the nacelle assembly 1050. In doing so, the aft section 1054 may be operable to remove obstructions to the intermediate opening 1059. In certain embodiments, the aft section 1054 may be deployable such that it is the radially innermost portion of the nacelle assembly 1050. For example, the aft section 1054 may deploy such that, along the radial direction R, at least a portion of the aft section 1054 is spaced apart from at least an adjacent portion of the forward section 1053.

The embodiments of FIG. 13 may be operable using various linkages, tracks, and/or connections, for example as described above. In various embodiments, movement or deployment of the aft section 954, 1054 may be controlled electronically and/or aerodynamically. For example, pressure from the external flow 960, 1060 may be operable to move or aid in moving the aft section 954, 1054 from the deployed position to the stowed position, or vice versa.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects are provided by the subject matter of the following clauses:

A turbofan engine comprising: a variable pitch fan rotatable about an axis and operable in a forward thrust mode by generating flow opposite a direction of travel and in a reverse thrust mode by generating flow in the direction of travel; a nacelle assembly disposed circumferentially around the variable pitch fan relative to the axis and defining at least in part a bypass passage, a forward opening of the bypass passage, and an aft opening of the bypass passage, the nacelle assembly further defining, in the reverse thrust mode, an intermediate opening disposed aft of the variable pitch fan; and a flow guide assembly, the flow guide assembly configured to: guide a first fluid flow opposite the direction of travel within the bypass passage from the forward opening to the aft opening in the forward thrust mode; and redirect a second fluid flow from outside the bypass passage opposite the direction of travel to inside the bypass passage in the direction of travel through the intermediate opening in the reverse thrust mode.

The turbofan engine of the preceding clause, wherein the nacelle assembly comprises at least one nacelle support configured to locate at least a portion of the nacelle assembly relative to the variable pitch fan.

The turbofan engine of the preceding clause, wherein the at least one nacelle support comprises a plurality of nacelle supports.

The turbofan engine of the preceding clause, wherein the flow guide assembly comprises a plurality of flow control features, and wherein the plurality of flow control features is circumferentially spaced apart between the plurality of nacelle supports.

The turbofan engine of the preceding clause, wherein the plurality of flow control features and the plurality of nacelle supports are provided in equal number.

The turbofan engine of any preceding clause, wherein the nacelle assembly comprises a fan cowl defining the forward opening and an aft cowl defining the aft opening, and wherein the flow guide assembly comprises at least one flow control feature disposed on an aft end of the fan cowl.

The turbofan engine of any preceding clause, wherein the at least one flow control feature comprises at least one of: a chevron; a mechanical vortex generator; a fluidic vortex generator; or a lip tubercle.

The turbofan engine of any preceding clause, wherein the at least one flow control feature defines a radius of curvature, wherein the radius of curvature is less than fifty percent of a nacelle thickness of the nacelle assembly.

The turbofan engine of any preceding clause, wherein the nacelle assembly comprises a fan cowl defining the forward opening and an aft cowl defining the aft opening, wherein the intermediate opening is positioned at least partially between the fan cowl and the aft cowl, wherein the flow guide assembly comprises at least one flow control feature disposed on a forward end of the aft cowl.

The turbofan engine of any preceding clause, wherein the at least one flow control feature comprises at least one deployable flow deflector.

The turbofan engine of any preceding clause, wherein the at least one deployable flow deflector is movable between: a first position in which the at least one deployable flow deflector connects the fan cowl and the aft cowl; and a second position in which the at least one deployable flow deflector redirects the second fluid flow through the intermediate opening.

The turbofan engine of any preceding clause, wherein the at least one deployable flow deflector comprises: a first deployable flow deflector configured to connect an inner surface of the fan cowl with an inner surface of the aft cowl in the first position; and a second deployable flow deflector configured to connect an outer surface of the fan cowl with an outer surface of the aft cowl in the first position.

The turbofan engine of any preceding clause, wherein the first deployable flow deflector is further configured to move in a radially inward direction relative to the axis to the second position, and wherein the second deployable flow deflector is configured to move in a radially outward direction relative to the axis to the second position.

The turbofan engine of any preceding clause, further comprising a core, wherein the flow guide assembly comprises one or more flow channels for generating at least one fluidic injection pressurized by the core.

The turbofan engine of any preceding clause, wherein the at least one fluidic injection comprises an air curtain.

The turbofan engine of any preceding clause, wherein the at least one fluidic injection comprises a fluidic vortex generator.

The turbofan engine of any preceding clause, wherein the nacelle assembly comprises a fan cowl defining the forward opening and an aft cowl defining the aft opening, wherein the aft cowl comprises at least one deformable member at least in part defining the aft opening of the bypass passage, wherein the at least one deformable member is configured to change a size of the aft opening in the reverse thrust mode.

The turbofan engine of any preceding clause, wherein the nacelle assembly comprises a fan cowl defining the forward opening and an aft cowl defining the aft opening, wherein the aft cowl comprises at least one deformable member at least in part defining the aft opening of the bypass passage, wherein the at least one deformable member is configured to increase a size of the aft opening in the reverse thrust mode.

The turbofan engine of any preceding clause, wherein the nacelle assembly comprises a fan cowl defining the forward opening and an aft cowl defining the aft opening, wherein the aft cowl comprises at least one deformable member at least in part defining the aft opening of the bypass passage, wherein the at least one deformable member is configured to reduce a size of the aft opening in the forward thrust mode.

The turbofan engine of any preceding clause, wherein the nacelle assembly comprises a fan cowl defining the forward opening and an aft cowl defining the aft opening, wherein the aft cowl is fixed axially relative to the fan cowl.

The turbofan engine of any preceding clause, wherein the flow guide assembly comprises at least one guide vane disposed in the intermediate opening.

The turbofan engine of any preceding clause, wherein the flow guide assembly comprises a plurality of guide vanes disposed in the intermediate opening.

The turbofan engine of any preceding clause, wherein the nacelle assembly comprises a fan cowl defining the forward opening and an aft cowl defining the aft opening, wherein an aft portion of the aft cowl is pivotable inwards in a radial direction.

A turbofan engine comprising: a variable pitch fan rotatable about an axis and operable in a forward thrust mode by generating flow opposite a direction of travel and in a reverse thrust mode by generating flow in the direction of travel; a fan cowl disposed circumferentially around the variable pitch fan relative to the axis, the fan cowl defining a forward opening of a bypass passage; and an aft cowl assembly, the aft cowl assembly comprising at least one deformable member at least in part defining an aft opening of the bypass passage, wherein the at least one deformable member is movable between: a first position corresponding to the forward thrust mode and in which the bypass opening is of a first size; and a second position corresponding to the reverse thrust mode and in which the bypass opening is of a second size greater than the first size.

The turbofan engine of the preceding clause, wherein the at least one deformable member comprises a plurality of deformable members disposed circumferentially about the axis to define the aft opening of the bypass passage.

The turbofan engine of any preceding clause, wherein the aft cowl assembly further comprises at least one flow control feature configured to redirect a fluid flow from outside the bypass passage opposite the direction of travel to inside the bypass passage in the direction of travel.

The turbofan engine of any preceding clause, wherein the at least one flow control feature comprises at least one of: a chevron; a mechanical vortex generator; a fluidic vortex generator; or a lip tubercle.

The turbofan engine of any preceding clause, further comprising a core, wherein the at least one flow control feature comprises at least one injected air curtain pressurized by the core.

The turbofan engine of any preceding clause, further comprising: an intermediate opening disposed axially between the fan cowl and the aft cowl relative to the axis; and a flow guide assembly, the flow guide assembly configured to: guide a first fluid flow opposite the direction of travel within the bypass passage from the forward opening to the aft opening in the forward thrust mode; and redirect a second fluid flow from outside the bypass passage opposite the direction of travel to inside the bypass passage in the direction of travel through the intermediate opening in the reverse thrust mode.

The turbofan engine of any preceding clause, wherein the flow guide assembly comprises at least one deployable flow deflector movable between: a first position in which the at least one deployable flow deflector connects the fan cowl and the aft cowl; and a second position in which the at least one deployable flow deflector redirects the second fluid flow through the intermediate opening.

We claim:

1. A turbofan engine comprising: a variable pitch fan rotatable about an axis and operable in a forward thrust mode by generating flow opposite a direction of travel and in a reverse thrust mode by generating flow in the direction of travel;
a nacelle assembly disposed circumferentially around the variable pitch fan relative to the axis and defining at least in part a bypass passage, a forward opening of the bypass passage, and an aft opening of the bypass passage, the nacelle assembly further defining, in the reverse thrust mode, an intermediate opening disposed aft of the variable pitch fan;
a flow guide assembly including one or more flow channels contained inside an internal portion of the nacelle assembly, wherein the flow guide assembly includes a first aft intermediate flow channel with a first exit portion providing flow outside of an aft section of the nacelle assembly that is aft of the intermediate opening and a second aft intermediate flow channel with a second exit portion providing flow that is aft of the intermediate opening into the bypass passage, the flow guide assembly configured to:
guide a first fluid flow opposite the direction of travel within the bypass passage from the forward opening to the aft opening in the forward thrust mode;
and redirect a second fluid flow from outside the bypass passage opposite the direction of travel to inside the bypass passage in the direction of travel through the intermediate opening in the reverse thrust mode; and wherein the first aft intermediate flow channel and the second aft intermediate flow channel of the flow guide assembly assist in redirecting the second fluid flow through the intermediate opening; and
a core including one or more core flow channels for generating at least one fluidic injection pressurized by the core, including to the first aft intermediate flow channel and the second aft intermediate flow channel.

2. The turbofan engine of claim 1, wherein the nacelle assembly comprises a fan cowl defining the forward opening and an aft cowl defining the aft opening, and wherein the flow guide assembly comprises at least one flow control feature disposed on an aft end of the fan cowl.

3. The turbofan engine of claim 2, wherein the at least one flow control feature comprises:
a fluidic vortex generator.

4. The turbofan engine of claim 1, wherein the nacelle assembly comprises a fan cowl defining the forward opening and an aft cowl defining the aft opening, wherein the intermediate opening is positioned at least partially between the fan cowl and the aft cowl, wherein the flow guide assembly comprises at least one flow control feature disposed on a forward end of the aft cowl.

5. The turbofan engine of claim 1, wherein the nacelle assembly comprises a fan cowl defining the forward opening and an aft cowl defining the aft opening, wherein the aft cowl is fixed axially relative to the fan cowl.

6. A turbofan engine comprising: a variable pitch fan rotatable about an axis and operable in a forward thrust mode by generating flow opposite a direction of travel and in a reverse thrust mode by generating flow in the direction of travel;
a fan cowl disposed circumferentially around the variable pitch fan relative to the axis, the fan cowl defining a forward opening of a bypass passage; and
an aft cowl assembly including a flow guide assembly having one or more flow channels inside an internal portion of the aft cowl assembly, and the aft cowl assembly defining an aft opening of the bypass passage, an intermediate opening disposed axially between the fan cowl and the aft cowl assembly relative to the axis, wherein the flow guide assembly includes a first aft intermediate flow channel with a first exit portion providing flow outside of an aft section of the aft cowl assembly that is aft of the intermediate opening and a second aft intermediate flow channel with a second exit portion providing flow that is aft of the intermediate opening into the bypass passage, the flow guide assembly configured to:
guide a first fluid flow opposite the direction of travel within the bypass passage from the forward opening to the aft opening in the forward thrust mode;
and redirect a second fluid flow from outside the bypass passage opposite the direction of travel to inside the bypass passage in the direction of travel through the intermediate opening in the reverse thrust mode; and wherein the first aft intermediate flow channel and the second aft intermediate flow channel of the flow guide assembly assist in redirecting the second fluid flow through the intermediate opening; and a core including one or more core flow channels for generating at least one fluidic injection pressurized by the core, including to the first aft intermediate flow channel and the second aft intermediate flow channel.

7. The turbofan engine of claim 6, wherein the flow guide assembly of the aft cowl assembly further comprises at least one flow control feature configured to redirect a fluid flow from outside the bypass passage opposite the direction of travel to inside the bypass passage in the direction of travel.

8. The turbofan engine of claim 7, wherein the at least one flow control feature comprises:
   a fluidic vortex generator.

\* \* \* \* \*